US008452620B1

(12) United States Patent
Grundfest

(10) Patent No.: US 8,452,620 B1
(45) Date of Patent: May 28, 2013

(54) PARAMETRIC DIRECTORS AND OFFICERS INSURANCE AND REINSURANCE CONTRACTS, AND RELATED FINANCIAL INSTRUMENTS

(75) Inventor: Joseph A. Grundfest, Palo Alto, CA (US)

(73) Assignee: Lowell Webster, LLC, Palo Alto, CA (US)

( * ) Notice: Subject to any disclaimer, the term of this patent is extended or adjusted under 35 U.S.C. 154(b) by 304 days.

(21) Appl. No.: 12/420,752

(22) Filed: Apr. 8, 2009

(51) Int. Cl.
*G06Q 40/00* (2012.01)
(52) U.S. Cl.
USPC ....... 705/4; 705/28; 705/35; 705/36; 707/999
(58) Field of Classification Search
USPC .............................................. 705/4
See application file for complete search history.

(56) References Cited

U.S. PATENT DOCUMENTS

| 7,330,820 | B1* | 2/2008 | Heyne et al. | 705/4 |
| 2008/0103841 | A1* | 5/2008 | Lewis et al. | 705/4 |
| 2008/0126139 | A1* | 5/2008 | Prendergast et al. | 705/4 |
| 2008/0140456 | A1* | 6/2008 | Glick et al. | 705/4 |
| 2008/0195439 | A1* | 8/2008 | Fidlow et al. | 705/7 |
| 2010/0076962 | A1* | 3/2010 | Doyle | 707/727 |

OTHER PUBLICATIONS

Stanford Law School, "Stanford Securities Class Action Clearinghouse", Sep. 2, 2008.*
Cornerstone Research, "Securities Class Action Filings 2008 Mid-year Assessment", 2008.*
Austega.com, "Individual Risk Distributions", May 16, 2007.*
Stanford Law School, "Stanford Securities Class Action Clearninghouse", Sep. 2, 2008.*
Cornerstone Research, "Securities Class Action Filings 208 Mid-year Assessment", 2008.*
John Spence, "MSCI to Adjust Indexes for Free-Float", Dec. 11, 2000.*
Amar Gande & Craig M. Lewis, "Shareholder Initiated Class Action Lawsuits: Shareholder Wealth Effects and Industry Spillovers", Jan. 2006.*
Austega. com, "Individual Risk Distributions", May 16, 2007.*
Jonathan T. Molot, "A Market in Litigation Risk", Apr. 2, 2009.*
ICICI, "Independent Director Litigation Risk", Oct. 2006.*
Baker, T., et al., "The Missing Monitor in Corporate Governance: The Directors' & Officers' Liability Insurer," 95 Georgetown Law Journal, 2006-2007, pp. 1795-1842.
Baker, T., et al., "How the Merits Matter: Directors' and Officers' and Officers' Insurance and Securities Settlements," 157 Univ. Pennsylvania L. Rev., 2009, pp. 755-832.

(Continued)

*Primary Examiner* — Rajesh Khattar
*Assistant Examiner* — Arunava Chakravarti
(74) *Attorney, Agent, or Firm* — Fenwick & West LLP

(57) ABSTRACT

The provision of parametric D&O insurance and reinsurance policies is afforded by systems and methods for determining one or more parametric indices of the risk arising from aggregate litigation activity, which risk is correlated with the financial exposures (e.g., payment cash flows) of the insureds' exposed to such claims, and of the insurers who provide primary D&O insurance coverage. A parametric index is for a given policy is determined from a set of parameters that define the type, scope, timing of litigation activity for the index, as well as details how the index values are determined from the underlying litigation exposure. The system and method further determine whether payments are due under such a policy and their amounts.

28 Claims, 9 Drawing Sheets

OTHER PUBLICATIONS

Baker, T., et al., "Predicting Corporate Governance Risk: Evidence from the Directors' & Officers' Liability Insurance Market," 74 U. Chi. L. Rev., 2007, pp. 487-544.

Blees, W., "Cat Bonds Find Their Calling," Risk, 2008, pp. 78-80, vol. 21.

Doherty, N., et al., "Moral Hazard in Reinsurance Markets," Department of Insurance and Risk Management, The Wharton School, University of Pennsylvania, Sep. 17, 2002, 29 Pages.

Finnerty J., et al., "Determinants of the Settlement Amount in Securities Fraud Class Action Litigation," 2 Hastings Business Law Journal, 2006, pp. 453-486.

Gastel, R., Reinsurance Fundamentals and New Challenges, Insurance Information Institute 4th ed. 2004, pp. 1-15, 26-44, 150-151, 156-167.

Golden, L., et al., "Handling Weather Related Ricks Through the Financial Markets: Considerations of Credit Risk, Basis Risk, and Hedging," The Journal of Risk and Insurance, 2007, pp. 319-346, vol. 74, No. 2.

Hays, D., "Nature Driven Derivative Hits Cat Market," National Underwriter, Jan. 21, 2008, 2 pages.

Harrison, C.M., "Reinsurance Principles and Practices," Insurance Institute of America, 2004, pp. v-viii, 1.5-1.17, 2.1-2.11, 2.16-2.21, 2.26-2.32, 10.1-10.33.

Huskins, P.C., "Why Are You Buying Side a Insurance?", Woodruff-Sawyer & Co., Mar. 2005, 2 pages, (available at: http://ssrn.com/abstract=956097).

Kerr, D., "Understanding Basis Risk in Insurance Contracts," Risk Management and Insurance Review, 2006, pp. 37-51, vol. 9, No. 1.

O'Leary, M., "Directors and Officers Liability Insurance Deskbook," American Bar Association, 2d. ed., 2007, pp. 37-97.

Paine, C., "Reinsurance," Institute of Financial Services, 2004, pp. v-vii, 33-67, 226-261.

Perino, M., "The Milberg Weiss Prosecution: No Harm, No Foul?," St. John's University School of Law, Legal Studies Research Paper Series Paper #08-0135, AE1 Legal Center for the Public Interest Briefly, May 2008, pp. 1-69, vol. 11, No. 9, (available at http://ssrn.com/abstract=1133995).

Ryan, E., et al., "Securities Class Action Settlements: 2008 Review and Analysis," Cornerstone Research, 2009, 24 pages.

Wattman, M., et al., "Insurance Risk Securitization," Journal of Structured Finance, Winter 2007, pp. 49-56.

Stanford Securities Class Action Clearinghouse, Stanford Law School, Last update on Aug. 3, 2009, [online] [Retrieved on Aug. 3, 2009] Retrieved from the internet <URL: http://securities.stanford.edu/>.

"Parametric Insurance," Wikipedia, viewed on Jul. 7, 2009, [online] [Retrieved on Jul. 7, 2009] Retrieved from the internet <URL:http://en.wikipedia.org/wiki/Parametric_insurance>.

* cited by examiner

PARAMETRIC DIRECTORS AND OFFICERS INSURANCE AND REINSURANCE CONTRACTS, AND RELATED FINANCIAL INSTRUMENTS

FIELD OF THE INVENTION

The invention relates to new systems and methods for providing insurance and reinsurance by integrating five distinct areas of specialization: (1) markets for directors and officers insurance ("D&O insurance"); (2) markets for reinsurance of D&O liability exposure ("D&O Reinsurance"); (3) markets for parametric insurance and reinsurance; (4) markets for financial instruments, such as catastrophe bonds and swaps, and (5) empirical analysis of the behavior of litigation markets, including, in particular, Federal class action securities fraud litigation.

BACKGROUND OF THE INVENTION

Current Practice in the Market for D&O Liability Insurance

Publicly traded corporations in the United States frequently purchase D&O liability insurance on behalf of their directors and officers in order to provide coverage against liability arising from class action securities fraud claims, and correlated proceedings, which can include by way of example and without limitation, state law derivative proceedings, SEC enforcement proceedings, state and federal civil or criminal enforcement proceedings, product liability claims, environmental exposure, and other types of litigation. D&O insurance typically contains three "insuring agreements" in a single policy, each of which provides a different type of coverage. Side A coverage reimburses covered individual directors and officers (as distinct from the corporate entity) for defense costs and payments of certain judgments or settlements not otherwise indemnified by the corporation. Side A coverage is generally written as "first dollar" coverage that is not subject to any deductible, also often referred to as a "retention." This form of coverage protects directors and officers in situations where the corporation lacks the assets to provide indemnification, most typically because it is insolvent, or where the corporation is legally prohibited from providing indemnification but the exposure remains legally insurable. Side B coverage, also known as "company reimbursement" coverage, reimburses the insured company for the cost of paying covered claims against insured directors and officers, when the company is permitted or required to indemnify, and when the company is sufficiently solvent to make such payments. Side B coverage is generally subject to a retention requirement and does not cover non-indemnifiable expenses, which may be covered under Side A. Because corporate indemnification obligations are generally broad, once the retention amount is exceeded, Side B coverage often becomes the de facto primary source of cash flow that supports payments to individual officers and directors pursuant to a D&O policy. Side C coverage addresses liabilities that arise when the company itself, as distinct from its directors and officers, is named as defendant in litigation and incurs expenses, including settlements and certain judgments, in connection with those claims. Side C coverage is also generally subject to retention. Corporations commonly purchase sides A, B and C, but market conditions occasionally cause corporations to purchase Side A coverage without also purchasing Side B or Side C coverage. Defense costs are generally covered by Sides A, B, and C. Thus, if a litigation is sufficiently complex or protracted, a significant amount of the policy's coverage limits can be exhausted prior to the settlement or resolution of the claims. In the extreme, the entire policy can be consumed by litigation expenses.

In order to spread the risk associated with covering any individual corporation, most D&O insurance programs include a primary layer of coverage offered by a primary insurer together with several additional layers of exposure ("excess layers") offered by different insurance companies. The primary and excess layer D&O policies are referred to herein as "direct policies." The primary and excess layer insurers are "direct insurers." The corporate entity purchasing the D&O policy is the "insured." These excess layers are "stacked" in a manner that gives rise to a contingent liability structure commonly known as "the tower" of excess layer coverage. The liability of each excess layer is generally conditioned on the exhaustion of each junior, or underlying, layer. Even relatively small D&O insurance programs can have multiple excess layers of policies issued by different insurers because each individual insurer seeks to limit its exposure to any one policy to a relatively small amount (e.g., $5 to 25 million). Insurers closer to the base of the tower have a higher probability of having to satisfy a claim than insurers higher in the tower. Because the probability of reaching any given excess layer depends on how remote that layer is from the primary layer of coverage, each successive coverage layer's pricing generally declines, where price is expressed as a percentage of the total potential exposure to the insurer.

Responsibility for managing the relationship with the insured generally rests with the primary insurer who assumes the first layer of potential liability. The primary insurer initially places, negotiates, and prices the policy, and also manages the claim in event of litigation. The primary insurer is compensated for the greater risk it assumes as a consequence of its first dollar loss exposure, and for the administrative costs associated with managing the primary insurer relationship. To diversify their liability risk, direct insurers commonly write portfolios of D&O policies for a number of companies, with varying degrees of diversification across market sectors, liability limits, and other factors.

Current Practice in the Directors' and Officers' Reinsurance Market

To further reduce the risk of exposure to claims against individual insureds, and to increase diversification, direct insurers turn to the reinsurance market. As currently practiced, D&O reinsurance policies typically cover a percentage of the loss attributable to the covered portion of the direct insurer's D&O liability portfolio on a follow-the-form basis. The direct insurer who purchases reinsurance coverage, whether a primary insurer or an excess layer insurer, is also referred to as the "cedent." Reinsurers thus step into the shoes of the direct insurers and do not renegotiate the terms of existing coverage with the insureds who have purchased the underlying D&O policies. Reinsurers thus assume "underwriting risk": if the direct insured has skillfully selected and priced its D&O coverage, then the reinsurer will incur relatively low reinsurance claims, but if the direct insured has not been skillful, then the reinsurer can incur a higher level of losses on its reinsurance coverage.

The obligation to make payments under D&O reinsurance agreements is contingent on the cedent having experienced a loss in excess of the reinsurance policy's deductible, or retention. However, because cedents may not incur losses in excess of retentions until several years after a litigation claim is asserted, and because the largest portion of the insurable exposure is in the form of settlements that are typically not paid until many years after a claim is filed, the largest cash flows under the direct D&O policies generally do not occur until several years after the direct policies have been written. It follows that reinsurers must also typically also wait for several years before being able to ascertain the potential exposure resulting from writing reinsurance coverage. This phenomenon is known as "long tail coverage," and generates increased credit risk because of the probability that the reinsurer will be unable to cover claims many years in the future.

The risk of reinsuring D&O coverage can be decomposed into two distinct elements: Incidence Risk and Intensity Risk. Incidence Risk describes the probability that an insured will be sued and will submit a claim. Intensity Risk describes the magnitude of the potential exposure to the direct insurer arising from a claim submitted by an insured, contingent on the prior realization of Incidence Risk. Insurers with superior underwriting practices will write policies with lower Incidence or Intensity Risk because they are able better to (1) identify corporations less likely to be sued, (2) identify corporations likely to generate smaller claims, or (3) manage claim exposures in a manner that reduces Intensity Risk. Current practice in the D&O reinsurance market thus generally causes a transfer of underwriting risk from the direct insurer to the reinsurer, without regard to whether the direct insurer has written primary or excess line coverage or whether the risk results from Incidence Risk or Intensity Risk.

Basis Risk describes the probability that a reinsurance policy will generate coverage that is not perfectly correlated with an underlying risk that the cedent seeks to hedge by purchasing a reinsurance policy. Because current forms of D&O reinsurance coverage are triggered only when insureds have already incurred losses pursuant to policies covered by the reinsurance agreement, current forms of reinsurance coverage generate low levels of basis risk to the insurers who purchase D&O reinsurance coverage, but they simultaneously transfer all underwriting risk to the reinsurer.

Current practice in the D&O insurance and reinsurance markets is subject to several distinct inefficiencies, many of which are inter-related. First, pricing in the D&O reinsurance market reflects the fact that reinsurers are required to assume all of the underwriting risk embedded in a direct insurer's portfolio. More specifically, because D&O reinsurers have no means of mitigating the underwriting risk inherent in the cedent's portfolios, reinsurers price their policies higher than would be the case if they were able to mitigate underwriting risk. The amount of reinsurance coverage available to direct insurers is also limited by the unwillingness of reinsurers to assume underwriting risk, which can be difficult to control and to measure. In extreme situations, both corporate entities and direct insurers can find themselves priced out of the direct insurance and reinsurance markets respectively, and hence rendered uninsurable or unreinsurable, because of perceived underwriting risk.

A further limitation of current market practice is that it does not allow insurers or reinsurers to distinguish systemic risk (such arises as a consequence of a general increase in litigation activity against all publicly traded firms in the United States) from idiosyncratic or underwriting risk (such as is reflected in a specific insurer's ability to select corporations that are less likely to file claims, or corporations likely to give rise to lower claims in the event litigation ensues).

A further limitation of the current reinsurance market structure is that direct insurers who purchase reinsurance coverage (and the reinsured who sell such coverage) must typically wait for several years before being able to determine with meaningful precision the size of the payment, if any, that they will receive (or have to pay) pursuant to the reinsurance contract. This time delay generates counterparty risk, also known as credit risk, which is here manifest most clearly by the risk that the reinsurer will become insolvent before it satisfies all of its obligations to purchasers of reinsurance coverage. Current capital market conditions, including the need for multi-billion dollar government assurances to major insurers in the D&O market, and impaired balance sheets of financial institutions worldwide, create a premium for contractual arrangements that can mitigate counterparty risk. A related consequence of this market practice which gives rise to long-tail exposure is that the reinsurer retains control of the capital that is expected to be paid to the cedent until the obligation to make a payment matures. The reinsurer is thus able to earn the investment returns (or must absorb the investment losses) because it is able to retain the reinsured's premium payments as well as the capital that will later have to be paid to cover claims for potentially long periods of time.

A further limitation of current market practice is that the stacking of excess layers generates incentive incompatibilities and disputes among providers of excess layers of coverage, which together increase transaction costs. For example, and without limitation, a direct insurer higher in the stack will prefer a low-risk litigation strategy that generates highly probable losses for direct insurers lower in the stack while reducing potential exposure for direct insurers higher in the stack. In contrast, insurers lower in the stack could rationally prefer higher-risk strategies that, if successful, eliminate their liability entirely but increase the probability of liability by insurers higher in the stack in the event the strategy fails.

A further limitation of the current technology is that the presence of insurance or reinsurance policies with payouts defined as a function of actual settlements creates an additional form of moral hazard. The terms and policy limits of the defendant corporation's specific insurance policies are generally disclosed to plaintiff counsel in class action securities fraud litigation. Once an insured's claims have exceeded the retention, plaintiff counsel can calculate that the cost of any settlement payment up to the policy limit will be borne by the insurer, not the insured, and that the insured defendant corporation should more readily acquiesce to a higher, externalized, settlement. A similar phenomenon is generated by the stacking of excess layers of coverage: to the extent that moving to the next layer in a stack of insurance involves additional transaction costs to plaintiff counsel, the presence of stacked layers can give rise to "firebreaks" within the stack, i.e., negotiation points that can slow plaintiff demands for a settlement amount that reaches into the next layer of coverage, but that can also strengthen the plaintiff's demand for a settlement up to the next layer of coverage.

A further limitation of the current technology is that it generates nontrivial transactions and monitoring costs in conjunction with the reinsurance claim settlement process. Because the reinsurer's obligation is contingent on the direct insurer having made certain payments to its insureds, the reinsurance claims process can involve the review of a large number of complex insurance agreements and related records to assure that coverage under the reinsurance agreement is appropriate.

Parametric Insurance and Reinsurance Markets

Parametric insurance and reinsurance describes a category of insurance and reinsurance agreements in which the insurance provider's obligation to make a payment is contingent on the occurrence of an objectively verifiable event, that is correlated with, but not determined by, any individual insured's or insurer's loss experience. Parametric reinsurance is used, for example, in catastrophe insurance market, where the liability of a reinsurer could be contingent upon the occurrence of specifically defined catastrophic events, such as a Class 5 hurricane touching down within the coastline of the state of Florida, or a 7.0 Richter scale earthquake occurring on the San Andreas Fault within 100 miles of San Francisco. Parametric reinsurance is possible for these types of events because historical experience, scientific data, and other factors provides a basis for quantifying the probability of these events and their impacts, and because reliable, objective metrics governing cash flows can be defined with precision in advance of any potentially insured event.

SUMMARY OF THE INVENTION

The present invention provides systems and methods for establishing and providing parametric D&O insurance policies that define the obligation to make insurance, or reinsurance payments, or functionally equivalent payments (such as through derivative financial instruments), as a function of the overall level of litigation activity against directors and officers in the market or industry as a whole, as measured by an index of litigation activity, rather than as a function of the actual losses incurred by any insured or direct insurer. In this context, "insurance" will be used to refer to direct insurance and reinsurance, as well as to retrocession agreements in which a reinsurer (the "retrocedent") transfers all or part of its reinsurance risk another reinsurer (the "retrocessionaire"). Because no insured direct insurer or reinsurer can control or influence the overall level of litigation activity in the market, and because no direct insurer's specific underwriting decisions or claims management practices influence the overall level of litigation activity, parametric D&O insurance policies can be structured so as not to reflect underwriting risk and can, all other factors equal, be priced to reflect systemic rather than idiosyncratic risk. These parametric D&O policies would thereby facilitate more efficient forms of risk shifting and mutualization in the reinsurance market, and disaggregate the pricing of systemic from idiosyncratic risk.

To provide parametric D&O insurance and reinsurance policies, the present invention provides a system and method for determining one or more parametric indices of the risk arising from aggregate litigation activity, which risk is correlated with the financial exposures (e.g., payment cash flows) of the insureds exposed to such claims, and of the insurers who provide primary D&O insurance coverage. The index is used to determine the flow of payments pursuant to a parametric D&O insurance or reinsurance agreement. The payments due under such an agreement can be determined with precision shortly after the end of the period covered by the parametric agreement.

Because the parametric index of D&O liability is based on the occurrence of litigation activity across the market, it is not subject to influence by insureds, insurers, or by any other third parties who may have an interest in the coverage provided by parametric reinsurance agreements. The index can thereby separate systemic from idiosyncratic underwriting risk. Because the computation of the underlying indexes can occur well before the resolution of the underlying claims, parametric policies can covert the long-tail risk characteristic of current D&O insurance and reinsurance technology into short-tail risk that mitigates credit risk and thereby improves pricing in the insurance and reinsurance markets. In addition, because parametric policy payments are determined with reference to index values that do not require reference to a detailed analysis of actual insurance coverage contracts or payments, the administrative costs associated with parametric insurance and reinsurance agreements can be materially lower than those required to implement the current technology. A further benefit of a parametric D&O insurance agreement is that it reduces the need to rely on stacking layers of excess coverage as a means of diversification among direct insurers, and thereby reduces associated incentive incompatibilities and transaction costs, including the moral hazard that arises as a consequence of plaintiff's knowledge of policy limits and excess layer structures. In addition, because parametric coverage can be structured so as not to be contingent on any individual insured's risk, parametric coverage does not generate the same form of externalization risk that arises under traditional forms of coverage.

Further, the present invention enables the insurers and reinsurers to define ("customize") a parametric index of D&O liability in a manner that permits an increase or decrease the amount of basis risk inherent (i.e., transfer of underwriting risk) in the parametric insurance or reinsurance agreement. This feature provides for the elective introduction and transfer of idiosyncratic underwriting risk in a manner and to a degree that can be controlled by the contracting parties and that is not possible in the current practice of D&O insurance and reinsurance.

In one embodiment, the parametric D&O insurance policies provide coverage for losses arising out of federal class action securities fraud litigation activity. In this embodiment, the underlying index (or indices) is based on a selection of such securities litigation as matches various parameters set forth in the D&O policy as to type, location, timing and other objectively measurable attributes of the litigation. In other embodiments, the parameteric index is based upon other identifiable events of litigation or of potential exposure to litigation, including without limitation, state corporate law derivative claims, financial restatements, announcements of formal or informal orders of inquiry entered by the SEC, announcements of federal or state civil or criminal enforcement proceedings errors and omissions claims, claims of patent infringement, claims of violation of the Foreign Corrupt Practices Act, and claims of product or environmental liability, and other events correlated with potential litigation exposure. Federal class action securities fraud litigation does, however, have particularly useful characteristics as the generator of the parametric D&O index because a broad range of potentially insurable D&O claims, including without limitation, costs incurred in connection with state law derivative proceedings, the conduct of internal investigations, and the defense of governmental inquiries, are correlated with the incidence and intensity of federal class action securities fraud claims.

The parametric indices can also be applied to the construction, design, and operation of other financial instruments with payoff functions defined in whole or in part as contingent on the level of litigation activity, including, without limitation, swaps, forwards, options, and indexed debt. These financial instruments need not be formally structured as insurance agreements, and can be purchased and/or sold by investors with long or short equity or debt positions, in which case the instruments would act as financial hedges against the occurrence of litigation related contingencies, such as described above. The same instruments can be bought or sold by persons without long or short positions in the relevant company's debt or equity, in which case the investment would constitute a directional investment whose outcome would be contingent on the occurrence of the underlying Incidence or Intensity Risk. The present invention further provides a system and method for customizing the basis-risk associated with any D&O insurance product, and with any financial instrument indexed to D&O exposure.

One embodiment of the present invention comprises a computer system that receives parameters defined in a parametric D&O insurance policy issued by a policy provider to a policy holder, and based on such parameters, generates a parametric index specific to the policy, and then uses the parametric index to determine whether the policy provider is obligated to make payments under the policy to the policy holder, and the amounts and timing of such payments. This embodiment includes a Parametric Index Management ("PIM") system having a number of computer implemented data-management and data-processing modules. These modules include a Case Tracking Module, a Temporal Allocation Module, a Stratification Module, an Intensity Measurement Module, an Index Generation & Cash Flow Module, as well as databases that include a Policy Database, an Insured Exposure Database, and a Master Index Database. Each module implements an associated protocol that is configured by parameters included in particular parametric D&O policy, which parameters are retrieved as needed from the Policy Database.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE DISCLOSURE

I. Overall System Architecture

Figure 1:
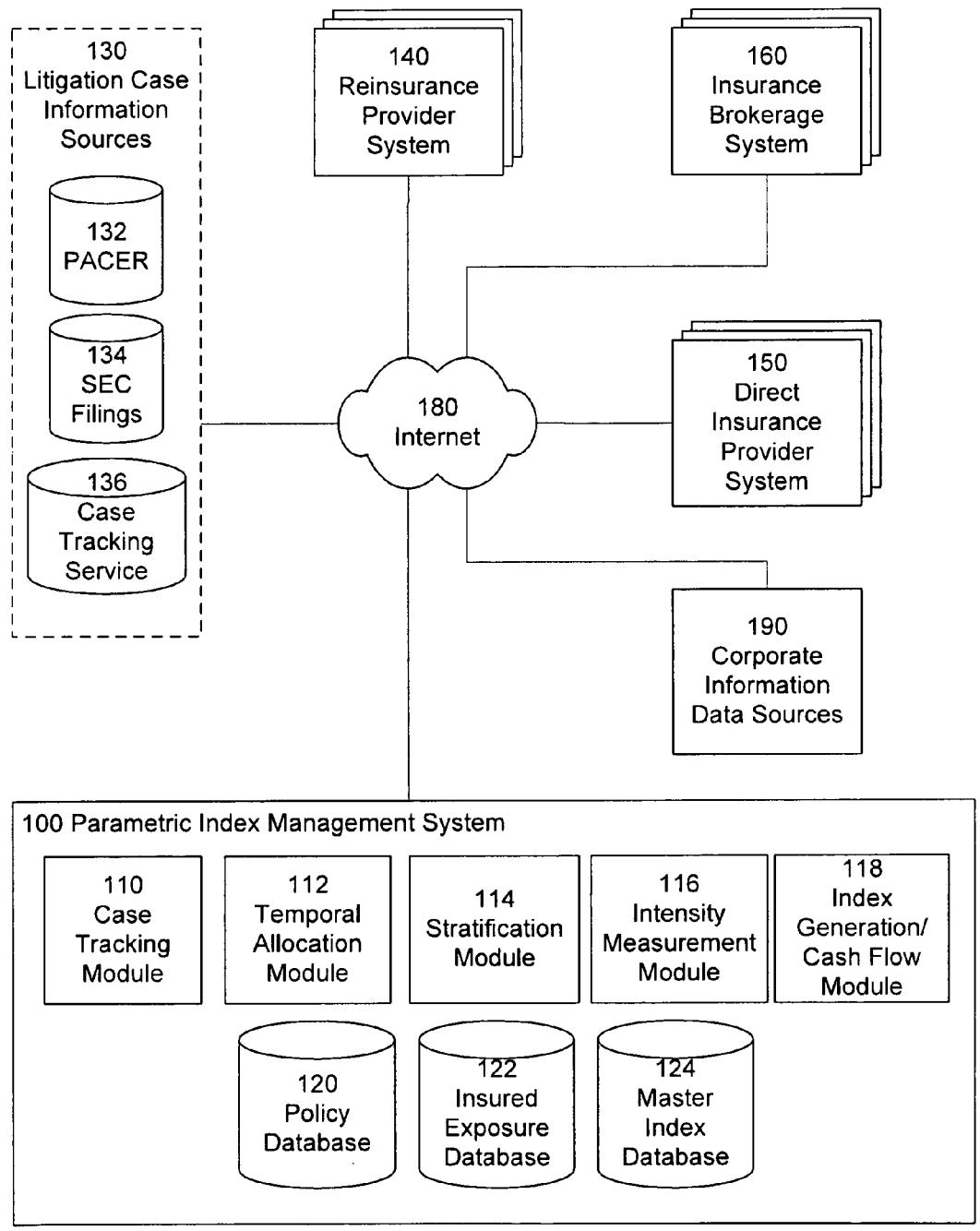
FIG. 1 illustrates a system architecture for one embodiment of the present invention.

FIG. 1 illustrates a system architecture for a parametric index management (PIM) system 100 that generates parametric indices based on litigation activity of one or more types against corporate entities, and a related Parametric D&O Insurance Agreement (P-D&O) based thereon. The types of litigation activity on which the parametric indices can be based are any type for which a insured would seek D&O insurance and any type for which a cedent would seek reinsurance, or a retrocedent would seek retrocession from a retrocessionaire, but are not limited to federal class action securities, state corporate law derivative claims, financial restatements, announcements of formal or informal orders of inquiry entered by the SEC, announcements of federal or state civil or criminal enforcement proceedings errors and omissions claims, claims of patent infringement, claims of violation of the Foreign Corrupt Practices Act, and claims of product or environmental liability. The embodiment described herein will focus on the use of federal class action securities litigation as the basis of the parametric indices. The use of the term "P-D&O" is intended to encompass all types of insurance agreements described herein, including direct, reinsurance and retrocession. The term "Deriviative P-D&O" is intended to encompass all types of derivative instruments (swaps, options, etc.), as well as other contractual mechanisms based their value on a parametric index-based mechanism as described in greater detail below, separate and apart from any agreement that might constitute an insurance agreement.

The PIM system 100 is configured as well to implement the method of the present invention. In the illustrated embodiment, the PIM system 100 comprises a Case Tracking Module 110, a Temporal Allocation Module 112, a Stratification Module 114, an Intensity Measurement Module 116, an Index Generation & Cash Flow Module 118, as well as databases that include a Policy Database 120, an Insured Exposure Database 122, and a Master Index Database 124.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules are implemented by software, they are stored on a computer readable storage device (e.g., hard disk), loaded into the memory, and executed by one or more processors included as part of the PIM system 100. Alternatively, hardware or software modules may be stored elsewhere within the PIM system 100. The PIM system 100 includes hardware elements necessary for the operations described here, including one or more processors, high speed memory, hard disk storage and backup, network interfaces and protocols, input devices for data entry, and output devices for display, printing, or other presentations of data. The operations of the PIM system 100 and its modules will be further described below with respect to FIG. 2 and the remaining figures. As will become apparent, the various data processing operations used to construct a parametric index are sufficiently complex and time consuming as to necessarily require the operation of a computer system such as the PIM system 100 in order to practice the present invention.

The PIM system 100 is communicatively coupled through the Internet 180, or other electronic communication mechanisms, to various other systems. The PIM system 100 has access to a variety of litigation case information sources 130 that are commercially available, and that provide information about pending and historical federal litigation. The sources 130 include the PACER system 132, SEC filings 134 available from the U.S. government, and third party case tracking services 136 such as the Stanford Securities Class Action Clearinghouse. Each of these systems exposes an application programming interface or other means by which the PIM system 100 can extract case data from the underlying databases managed within these systems. From these various systems, the PIM system 100 retrieves detailed information relating to litigation activity in the U.S., which information is processed to generate the relevant parametric indexes.

The PIM system 100 is configured to communicate programmatically with reinsurance provider systems 140, insurance and reinsurance brokers systems 160, and direct insurance provider systems 150. The reinsurance provider systems 140 are computer systems maintained by various reinsurance providers, and which provide the PIM system 100 with information pertaining to the particulars of individual P-D&Os issued by the reinsurance provider. The direct insurance provider systems 150 are computer systems maintained by the direct insurers of D&O insurance polices, and also provide the PIM system 100 with information pertaining to the particulars of individual P-D&Os issued by the direct insurer. The insurance brokerage systems 160 are computer systems maintained by brokers of parametric D&O insurance and reinsurance policies.

The PIM system 100 can be operated by a standalone entity that provides the parametric index information and data processing services of the system to parties such as reinsurers, brokers, insurers and insureds. Alternatively, the PIM system 100 can be operated by a reinsurer on its own behalf as part of its reinsurance provider system 140, or by a reinsurance or insurance brokerage as part of its brokerage system 160. In the preferred embodiment, the PIM system 100 is operated by an objective, independent third-party provider with no interest in the financial implications of the calculation of the parametric index.

In one embodiment, the PIM system 100 is used after a P-D&O has been agreed upon by policy provider and a policy holder. When the P-D&O is issued by a direct insurer, then the direct insurer is the policy provider and the insured corporate entity is the policy holder. When the P-D&O is issued by a reinsurer, then the reinsurer is the policy provider and the direct insurer (cedent) is the policy holder. When the P-D&O is issued by a reinsurer engaged in a retrocession agreement, then restrocessionaire is the policy provider and the retrocedent is the policy holder. The terms of the P-D&O define a series of parameters that in turn act as inputs into the PIM system 100 and control the generation of the parametric index relevant to the determination of the cash flows required pursuant to that particular P-D&O. A further embodiment in which the PIM system 100 is used to define, a plurality of different parametric indices that are publicly available, or privately calculated, is further described below. The parameters defined by the P-D&O are follows.

The Case Tracking Protocol Parameters describe the temporal and subject matter conditions for determining which litigation events will be included as the basis from which the parameter index is constructed. More particularly, a Domain Definition prescribes the subject matter type of complaints and other judicial or regulatory filings (collectively referred to as "filings") that can contain data that enter into the calculation of the parametric index. A filing can be for any type of identifiable event that is part of a litigation or that gives rise to a potential exposure to litigation, including without limitation, state corporate law derivative claims, financial restatements, announcements of formal or informal orders of inquiry entered by the SEC, announcements of federal or state civil or criminal enforcement proceedings, errors and omissions claims, claims of patent infringement, claims of violation of the Foreign Corrupt Practices Act, and claims of product or environmental liability, and other events correlated with potential litigation exposure. An example of a Domain Definition is the set of federal class action lawsuits that allege violations of the federal securities laws. The Domain Definition further specifies the particular complaint or complaints to be used as the Reference Complaint and from which essential data are extracted, such as class period beginning and end dates, the identities of defendants, stated causes of action, and filing dates. An example of a Reference Complaint is the first filed complaint, or the most recently filed complaint, or the complaint filed by the largest institutional investor, if any such complaint is filed. The Reference Period specifies the time period over which filings are to be considered as contributing to the calculation of the parametric index. An example of a Reference Period is a calendar year.

The Temporal Allocation Protocol Parameters define various time periods used to determine which cases will be included in the computation of the parametric index. They include the length of a Stub Period following the reference period, and the length of a Computation Period, and Sorting Protocol.

The Stratification Protocol Parameters further defines or filters the subset of the Domain Definition filings that are to be included in the calculation of the parametric index specified by the P-D&O based on categorical characteristics. More specifically, the parameters indicate whether the policy holder can add or delete insured entities from the Reference Cases, whether the parametric index is to be customized based on the policy holder's portfolio or market factors, whether Reference Cases are to be included or excluded based on industry classification, geography, types of allegations, and the identity of the defendants or plaintiffs. At the extremes, the Stratification Protocol can select a single company or the market as a whole.

The Intensity Measurement Parameters define the computations used to calculate the potential loss ("intensity" or exposure) created by any filing in the stratified database. These parameters include the type of metric to be used to measure potential financial exposure from the litigation, such as change in market capitalization of publicly traded common equity (or of other publicly traded classes of securities, including, without limitation, preferred stock, convertible debentures, and debt) over the entire Reference Period, specific trading days, a particular formulaic metric, or a regression metric. The parameters here also include whether to adjust the individual exposure values based on the likelihood of increased exposure due to enforcement proceeding, or in relation to recovery ratios, and whether to truncate the individual intensity measures from above based on policy limits that place an absolute ceiling on any insurer's loss on any one claim, or from below based on retentions below which insurers have no exposure.

The Cash Flow Protocol Parameters define the specific computation for the parametric index, and the conditions ("triggers") which require the seller of the P-D&O makes contingent payments to the purchaser when the trigger is satisfied. The parameters include whether the index is computed as simple sum of the individual entity exposures previously determined, or some more complex transformation. The types of triggers that can be defined include a binary trigger (e.g. a single threshold value for the index), a staggered trigger, or a continuous payoff function.

Once a P-D&O has been entered into by a policy provider (also know as an insurer, policy seller or policy writer) and a policy holder (also known as an insured, or policy purchaser), the terms of the P-D&O are input into the PIM system 100 and stored in the Policy Database 120. The Policy Database 100 (as well as the Insured Exposure Database 122 and the Master Index Database 124) operates on high performance database computer hardware, and can be part of the PIM system 100, or a standalone computer system.

Figure 2:
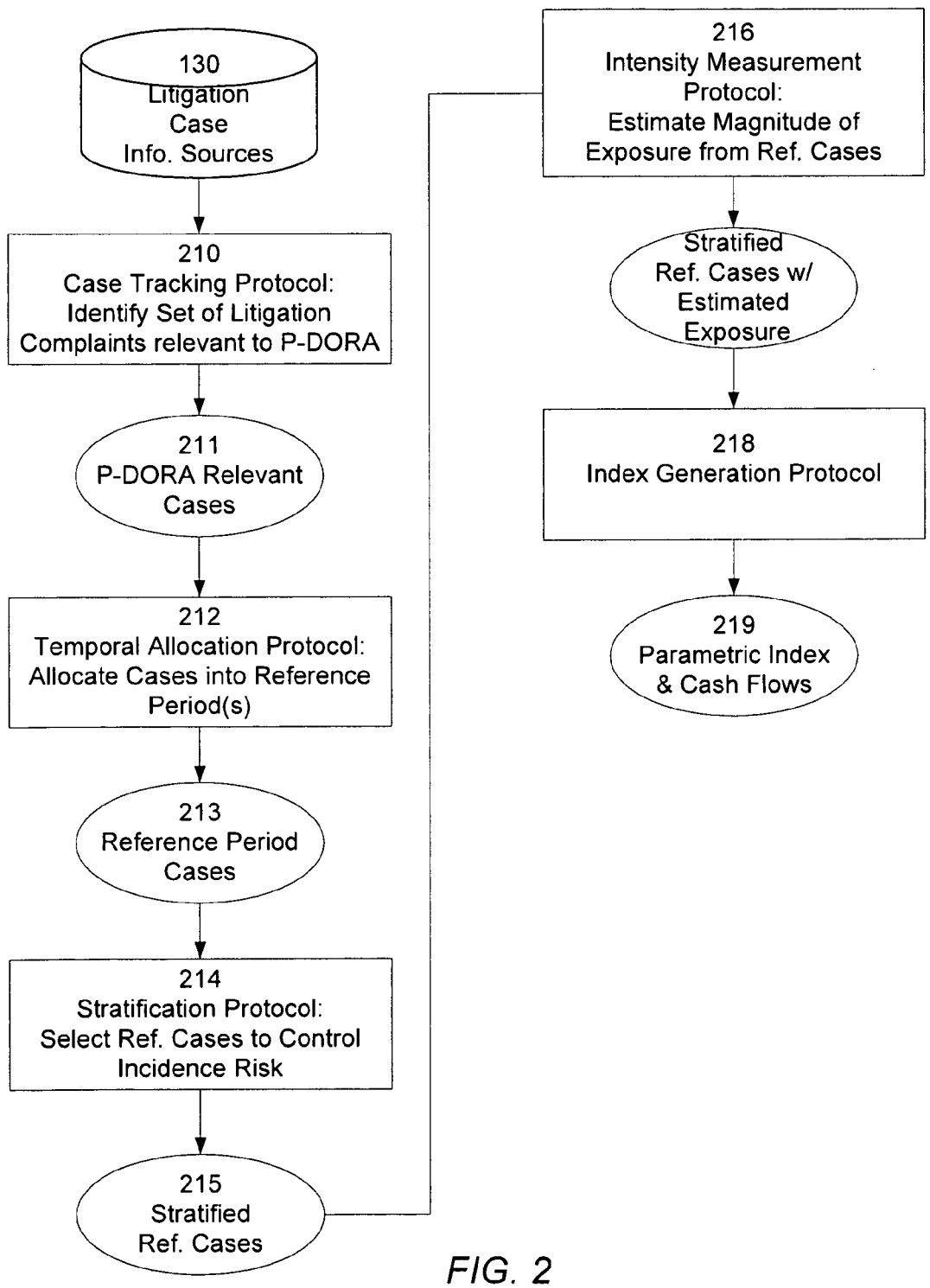
FIG. 2 illustrates one method for calculating a parametric index that measures federal class action securities fraud litigation activity and implements a related Parametric Directors and Officers Insurance Agreement ("P-D&O").

Referring now to FIG. 2, there is shown an overview of the methodology of the present invention, as implemented by the PIM system 100. As previously mentioned, the operation of the PIM system 100 uses parameters set forth in the P-D&O as inputs, which data are stored in the Policy Database 120. These inputs are provided to the various modules described above. The modules take these inputs, along with inputs from the litigation case information sources 130 and other sources, such as stock price trading and volume data, and transform that information into one or more parametric indices, which in turn are then used to determine cash flows (i.e. payments) from the insurance provider to the policyholder.

The method begins with the execution of a Case Tracking Protocol 210, executed by the Case Tracking Module 110. The function of this Protocol is to identify the set of federal litigation matters that satisfy the Domain Definition articulated in the P-D&O, and to extract from those filings and related information sources data necessary for the calculation of the index. These data include the identity of the parties to the litigation, the filing date, the beginning and ending dates of the class period alleged in the complaint, the causes of action alleged in the complaint, and data related to the prices at which the defendant's publicly traded securities transacted during the alleged class period.

The Case Tracking Module 110 obtains the set of cases from the litigation case information sources 130 by querying such sources using queries based on the P-D&O terms, and is one example of a means for performing this function. Thus, the Case Tracking Module 110 can query the information sources by date, name of parties, subject matter of the litigation, causes of action, and so forth. Alternatively, the PIM system 100 may maintain its own local database of cases (by, for example periodically extracting all new and updated federal litigation filings from the litigation case information sources 130), in which case the Case Tracking Module 110 queries this local database for the relevant case list. The output from Protocol 210 is a set of federal litigation cases 211 that match the Domain Definition in the P-D&O. This dataset is stored in memory for further processing.

The data 211 generated by the Case Tracking Protocol 210 are then processed according to a Temporal Allocation Protocol 212 by the Temporal Allocation Module 112, which is one example of a means for performing this function. The function of this Module and Protocol 212 is to allocate each litigation matter in the Domain Definition 211 into the appropriate Reference Period over which the parametric index is to be computed. A single P-D&O, as described in this preferred embodiment, will typically cause each litigation matter to be assigned to a single Reference Period. The output of the Temporal Allocation Module 112 is a data set of Reference Period Cases 213. This dataset is stored in memory for further processing.

The Reference Period Cases 213 are then further filtered according to a Stratification Protocol 214 by the Stratification Module 114, which is one example of a means for performing this function. The function of this Module and Stratification Protocol 214 is to identify the subset 215 of Reference Period Cases 214 over which the parametric index is to be computed, by including or excluding litigation cases from the Reference Period Cases 213 based on one or more categorical characterstics of the litigation cases, thereby controlling the level of basis risk attributable specifically to incidence risk. The Stratification Protocol 214 further provides for optional basis risk customization through procedures that can either link the parametric index to a specific set of insureds who have purchased coverage from a specified insurer, or to various subsets of litigation activity that are defined by industry, geography, litigants, or other factors, or to market-wide litigation activity. The output of the Stratification Module 114 is a dataset of Stratified Reference Cases 215, which is also stored in memory.

The Stratified Reference Cases 215 are then processed according to an Intensity Measurement Protocol 216 by the Intensity Measurement Module 116, which is one example of a means for performing this function. The function of this Module and Intensity Measurement Protocol is to generate a dataset 217 that quantifies the anticipated magnitude of the exposures likely to be generated by these Stratified Reference Cases 215. The Intensity Measurement Protocol 216 controls the portion of basis risk generated by intensity risk, i.e., the exposure to an insurer that results conditional on an insured having filed a claim related to a Stratified Reference Case. The Intensity Measurement Protocol 216 thereby provides for an additional dimension of customization allowing purchasers and sellers of P-D&Os to control, the contribution of any single litigation event, measured by its intensity, to the overall calculation of the index. The output of this Protocol 216 is a dataset 217 of the Stratified Reference Cases with an estimated magnitude of exposure for each of these cases, along with a measure of the aggregate exposure from the set of all Stratified Reference Cases 215. This information can also be annotated into the records of the Stratified Reference Cases 215. The dataset is likewise stored to memory.

At this point, the set of Stratified Reference Cases 215 represents those litigation events that satisfy the parameters of the P-D&O, and are used to determine whether the P-D&O policy provider's contingent obligation to make payments to the P-D&O purchaser has been triggered, regardless of whether the purchaser has in fact experienced a loss (e.g., paid a claim) as a consequence of any specific litigation that contributes to the calculation of the P-D&O index. This is in contrast to conventional, non-parametric D&O insurance policies, where the liability of the reinsurer to the insurer generally arises only after the real world event of a claim paid by the direct insurer to the insured.

The output 217 of the Intensity Measurement Protocol 216 is then processed according to an Index Generation Protocol 218 by the Index Generation & Cash Flow Module 118, which is one example of a means for performing this function. The function of this Module and Protocol 218 is to generate a parametric index 219 comprising set of index values that define the amount and timing of cash flows between the policy provider and the policy holder (e.g., between a direct insurer and insured, or between a reinsurer and a direct insurer). Typically a cash flow is a payment made by a policy provider to a policy holder arising from the P-D&O upon the trigger condition of the index value exceeding some predefined value stored in the Policy Database 120.

Among the various benefits of a P-D&O in comparison with traditional D&O reinsurance and insurance techniques are that it: (1) reduces the time-period over which the reinsurer, or other seller of the policy, must make payments, thereby transforming a long-tail risk into a short-tail risk, and reducing the credit risk involved in the reinsurance or insurance transaction; (2) provides for the customized disaggregation of the risk transfer inherent in any D&O insurance or reinsurance agreement into distinct systemic components, which are related to the overall level of litigation activity in the market, and idiosyncratic components, also known as "underwriting risk", which are a function of the specific loss experience of an individual direct insurer or insured, and thereby provides for enhanced portfolio optimization techniques in addition to the discrete pricing of systemic and idiosyncratic risk; (3) provides a means for entities that are uninsurable or un-reinsurable through traditional mechanisms because of their high levels of idiosyncratic risk to obtain partial coverage through a P-D&O that is insensitive to the purchaser's idiosyncratic risk; (4) reduces the transaction costs associated with administration of the insurance policy because it eliminates the need to review claims histories that must be submitted in order to obtain coverage under traditional insurance and reinsurance arrangements; (5) reduces moral hazard that can be generated by plaintiffs' knowledge of policy limits and of the structure of excess layer coverage; and (6) reduces the incentive incompatibilities that can arise among insurers at different levels of the coverage stack.

Embodiments of the Modules and Protocols are now described in further detail.

II. Detailed Module Design

1. Case Tracking Module and Case Tracking Protocol

The generation of a parametric index relies in part on the identification of a set of lawsuits that are consistent with contractual parameters set forth in a given P-D&O, and that contain information useful for the construction and calculation of the index specified by the P-D&O. Further, because litigation complaints are subject to amendment, consolidation, and modification, and because multiple complaints arising from a single course of conduct can be filed, the P-D&O may optionally include a parameter specifying that the extracted information be updated to reflect events subsequent to an initial filing, or that multiple filings be tracked in connection with a single defendant or course of conduct.

Figure 3:
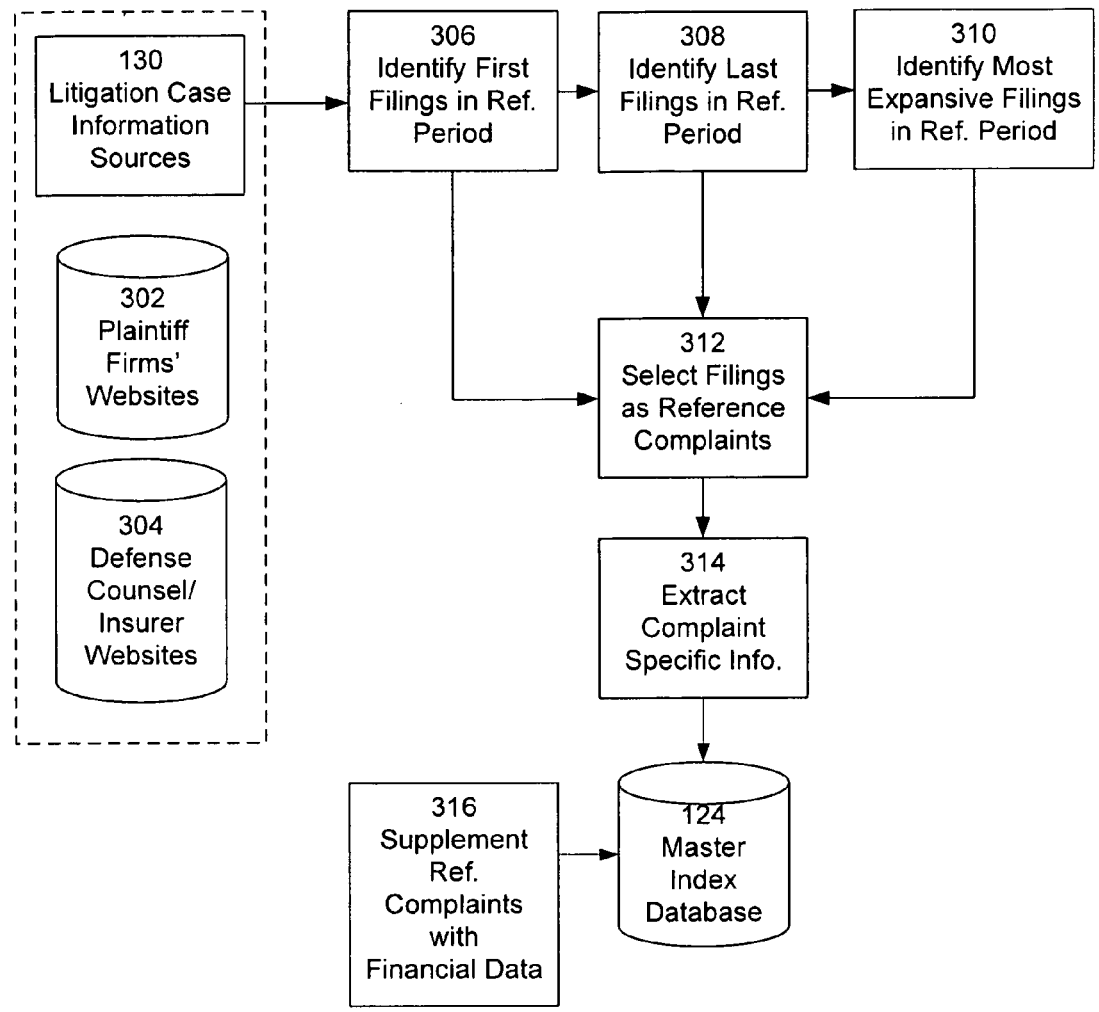
FIG. 3 illustrates an implementation of the Case Tracking Protocol.

Referring to FIG. 3, there is shown a flow diagram of one embodiment of the Case Tracking Protocol 210. The Case Tracking Protocol 210 is initiated by a computerized search of the litigation case information sources 130. These sources can be supplemented by searches of on-line websites 302 operated by plaintiff class action firms which often advertise for clients willing to act as lead plaintiffs in such litigation or otherwise join the action, or information sources 304 provided by defense counsel or insurers.

As described above, one of the Case Tracking Protocol Parameters in a P-D&O is the Reference Period. Accordingly, the Case Tracking Protocol 210 uses the start and end dates of the Reference Period to identify 306, 308, 310 the first litigation filing during the Reference Period, the last litigation filing during the Reference Period, and the most expansive litigation filing during the Reference Period (measured according to a pre-specified metric, such as the length of the class period alleged, or the number of defendants identified), or by a host of other criteria.

For each litigation represented by one of these filings, the version of one of these filings upon which the parametric index is subsequently constructed is selected 312 as the Reference Complaint for the litigation, thereby producing a set of Reference Complaints relevant to the P-D&O. If the Case Tracking Protocol Parameters specify 306 that the first filing 306 constitutes the Reference Complaint for the litigation then the Module 110 sorts through the relevant docket, or other case related information, to identify 312 the earliest filed complaint. From the identified complaint, the Module 110 extracts 314 the relevant Complaint Specific Information (CSI), which comprises, for example, (1) the identity of all named defendants; (2) the start date of the alleged class period; (3) the end date of the alleged class period; (4) the date of all corrective disclosures alleged in the complaint; (5) the causes of action alleged in the filing; (6) the date of the filing; (7) the jurisdiction in which the complaint is filed; (8) the law firms representing the named plaintiff; and (9) the names of the plaintiffs on whose behalf the class action complaint is filed.

If the Case Tracking Protocol Parameters specify 308 that the last filing during the Reference Period constitutes the Reference Complaint, then the Case Tracking Module 110 sorts through relevant docket, or other case related information, to identify 312 that filing, and proceeds, as above to extract 314 the relevant CSI.

Alternatively, if the Case Tracking Protocol Parameters specify 310 the Reference Complaint as the most expansive complaint filed during the Reference Period then the protocol proceeds to collect all complaints filed during the Reference Period for purposes of identifying 312 the most expansive complaint. The most expansive complaint can be defined as being either a single actually filed complaint or as a "synthetic complaint." If defined as an actually filed complaint, the Case Tracking Protocol Parameters will specify how "most expansive" is determined, e.g., the length of the class period. If defined as a "synthetic complaint," the Case Tracking Protocol Parameters then specify the most expansive metrics from among the set of filed complaints that are to be used to construct the synthetic Reference Complaint. Examples of such a synthetic complaint include a Reference Complaint constructed as an amalgam of the earliest class beginning date mentioned in any filed complaint, of the latest class ending date, of every defendant named in any complaint, and of any cause of action named in any complaint. In the event a lawsuit proceeds with sufficient speed that a consolidated complaint is filed during the Reference Period, there may be an override mechanism specifying that the most recent consolidated complaint take precedence as the Reference Complaint over any other document. The Protocol then proceeds to extract 314 the CSI from the Reference Complaint, which may here be a synthetically constructed filing.

The identified set of Reference Complaints forms the P-D&O relevant cases 211 described with respect to FIG. 2. The CSI identified from each of the Reference Complaints is then entered into the Master Index Database 124, and is supplemented 316 by additional financial information that may be useful for computation of the index. Such information may include, without limitation, data describing end of trading day stock prices and daily volume of the named publicly traded defendants' securities during the relevant class period, and stock ownership data as reflected on Forms, 3, 4, and 5 or 13D, 13F or 13G, as filed with the SEC, or as made publicly available by independent data aggregators. The result is a Master Index Database 124 that, together with specifications stored in the Policy Database 120, contains all information necessary for the computation of the parametric index.

2. Temporal Allocation Module and Temporal Allocation Protocol

Insurers are typically exposed to liability on a "claims made" basis. This fact generates significant potential complexity in the design and construction of a parametric litigation index because the date as of which a claim is made is generally not a matter of public record. In particular, a claim may be made on an insurer before or after a complaint is filed. Experience suggests, however, that claims are likely made on or about the date on which the first complaint is filed, or on or about the date of the corrective disclosure that animates the filing, which date is generally the last date of the class period alleged in a class action securities fraud complaint, and which date precedes the date on which the complaint is filed.

Figure 4:
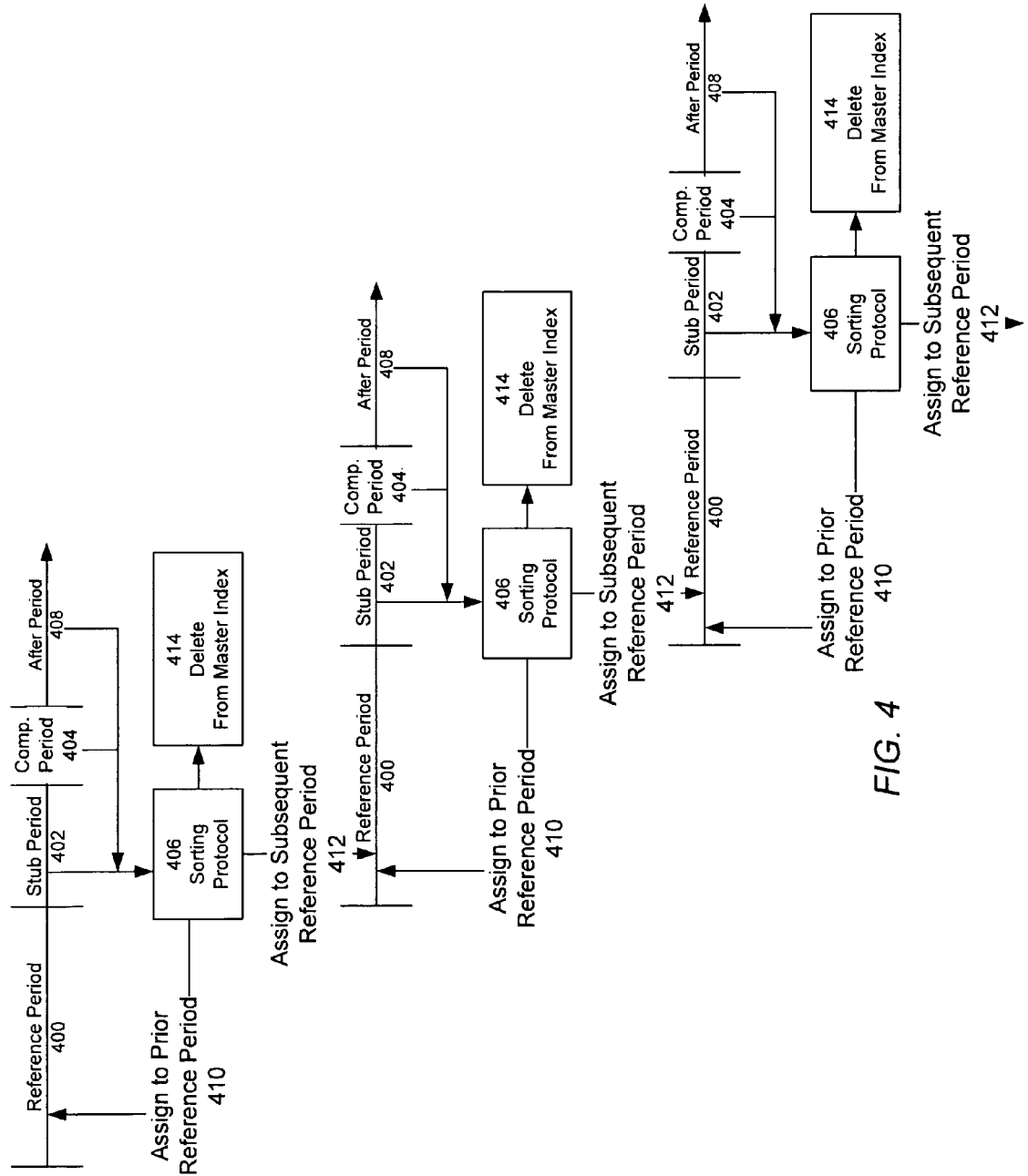
FIG. 4 illustrates an implementation of the Temporal Allocation Protocol.

To address this complexity, the Temporal Allocation Protocol 212 uses the Reference Period as previously defined, a Stub Period, a Computation Period, and a Sorting Protocol 406 to allocate cases into the appropriate Reference Period over which the parametric index is to be computed. FIG. 4 illustrates these aspects. As discussed above, each parametric index is defined over a Reference Period 400, i.e., the period over which litigation activity is to be measured. Calendar years are the most likely Reference Period because D&O insurance policies are typically written to cover claims made during a calendar year period, although P-D&Os may specify longer or shorter periods, or year-long periods that do not correspond to calendar years.

The Stub Period 402 is a contractually defined period of time following the Reference Period 400 during which filed complaints are analyzed in accordance with the Sorting Protocol 406, as described below, to determine whether those complaints should be included in any particular Reference Period 400. As an illustrative matter, the Stub Period 402 can be defined as the three month period following a calendar year Reference Period 400.

The Computation Period 404 is a contractually defined period of time following the end of the Stub Period 402 during which a computation agent generates the relevant parametric index values. As an illustrative matter, the Computation Period 404 can be defined as 45 days. Thus, in the case of a P-D&O that specifies a calendar year Reference Period 400 starting on January $1^{st}$ and ending December $31^{st}$, a three month Stub Period 402 that ends on the next March $31^{st}$, and a 45 day Computation Period 404, the relevant parametric index values are available on May $15^{th}$ following the end of previous calendar year, and can be settled shortly thereafter.

All cases filed during the Reference Period 400 are assigned to that Reference Period 400. All cases filed during the Stub Period 402 are analyzed pursuant to the Sorting Protocol 406 to determine the end of the class period alleged in the complaint. The Sorting Protocol 406 may, as a parameter defined in the P-D&O, adopt the rule that any complaint filed during the Stub Period 402 that alleges an end of class date occurring during the preceding Reference Period 400 relates to a lawsuit that also caused a claim to be made during the preceding Reference Period 400. The rule follows from the observation that insureds can submit notices of claim shortly after a significant stock price decline, even if no complaint is yet on file, and have incentives to do so in order to assure coverage under an existing policy. In that event, the Sorting Protocol 406 assigns 410 the complaint to the preceding Reference Period 400 and treats it as though it were in fact filed during the preceding Reference Period 400.

Alternatively, the Sorting Protocol 406 can be defined so as to allocate some or all of the cases filed during the Stub Period 402 to the subsequent Reference Period 400, or to delete them from the sample used to compute the parametric index. In addition, complaints filed after the end of the Stub Period 402, during the Computation Period 404, or after (408) the end of the Computation Period, cannot, by construction, be included in the calculation of a parametric index for the preceding Reference Period 400, even if the complaint contains an end of class period date that relates back to the preceding Reference Period 400. The Sorting Protocol 406 addresses this contingency through a contractually specified rule in the P-D&O that causes such late-filed cases either to be assigned 412 to a subsequent Reference Period 400, or to be altogether deleted 414 from the sample used to construct the parametric index.

As illustrated in FIG. 4, this Temporal Allocation Protocol 212 is then repeated for each subsequent Reference Period 400 in order to generate a contractually and temporally consistent allocation of complaints to Reference Periods 400.

Although not specifically illustrated in FIG. 4, the initial Reference Period 400 that initiates a P-D&O can also be subject to Sorting Protocols 406 that are designed to eliminate from the initial Reference Period 400 all cases that should have been allocated 410 to a preceding Reference Period 400, just as though that initial Reference Period also included within it a Stub Period 402, Computation Period 404, and a later filed complaint Sorting Protocol 406.

The result of the operation of this Temporal Allocation Program is a mapping that assigns each Reference Complaint to a contractually appropriate Reference Period, which may or may not correspond to the actual date as of which the Reference Complaint was filed.

3. Stratification Module and Stratification Protocol

D&O insurance contracts and related financial instruments generate basis risk, also often described as "underwriting risk" in two distinct forms: Incidence Risk and Intensity Risk. Incidence Risk describes the probability that a claim will be filed against a named insured during any Reference Period. Intensity Risk measures the likely exposure to an insurer contingent on a complaint having been filed. As of the date of the application of the Sorting Protocol, Incidence Risk is a binary state that describes whether any particular issuer has in fact been named as a defendant in federal class action securities fraud litigation during a specified Reference Period, and can be known with certainty. In contrast, as of the date of the application of the Sorting Protocol, Intensity Risk typically remains unknown because the magnitude of the claim to be resolved, and related litigation expenses, cannot be determined for months or years. Intensity Risk can thus be characterized as a continuous variable that describes a probability distribution of potential losses to an insurer, or to an insured, arising from the fact that a particular complaint has been filed.

The Stratification Protocol provides a methodology to include or exclude litigation cases from the Reference Period Cases 213 based on one or more categorical characterstics of the litigation cases, thereby allowing the policy provider and the policy holder to jointly controlling Incidence Risk in a customizable manner. At one extreme, Incidence Risk can be adjusted to reflect the specific portfolio of companies insured by a policy holder of parametric reinsurance, or even the risk related to litigation or litigation-related events involving a single company. In this situation, the P-D&O transfers all of the underwriting risk associated with the ability to identify companies likely to be sued from the policy holder of the P-D&O, to the policy provider. At the other extreme, the P-D&O allows Incidence Risk to be adjusted so that it reflects all litigation risk that arises in the market over any defined Reference Period and is entirely unrelated to underwriting decisions made by any individual market participant (e.g., underlying insured, direct insurer, or reinsurer) thereby causing no transfer of underwriting risk arising from incidence risk through the P-D&O to the policy provider. Intermediate levels of basis risk attributable to Incidence Risk can be generated by defining a variety of functions of factors such as the industry sector of the named publicly traded corporation. Intermediate levels of Incidence Risk generate correspondingly intermediate levels of moral hazard. The P-D&O thus creates an ability to measure, subdivide, and allocate underwriting risk specifically attributable to Incidence Risk that is currently not present in the market.

These intermediate measures of Incidence Risk can, for example, be generated through the application of sub-indexes of a parametric index, for specific industrial categorizations, such as the financial, high-technology, biotech, energy, defense sectors and so forth. These sub-indices are based fact that some insurers tend to specialize in certain industries, and that there can be wide variations in litigation intensity across industry sectors, and thus sub-indices for industrial classification allows such insurers to more precisely manage their Incidence Risk.

Sub-indices can also be constructed to reflect any combination of the following categorical characteristics:

the geography in which the lawsuit is filed or in which the defendant is headquartered, or whether the issuer is a foreign entity whose securities are traded in the United States through American Depository Receipts ("ADR"s) (on the theory that some jurisdictions are more or less likely to generate higher or lower settlements, or higher or lower rates of dismissal, or that some market participants are particularly exposed to litigation against foreign entities with securities traded in the United States);

the identity of plaintiff law firms filing the complaints (on the theory that certain larger, more successful plaintiff firms are more likely to file claims in larger cases that are more likely to generate exposure);

the legal causes of action articulated in the complaint (thereby, for example, permitting a focus on litigation presenting exposure under Section 11 of the Securities Act as distinct from liability under Section 10(b) of the Exchange Act);

the nature of the plaintiffs seeking lead plaintiff status (on the theory that large institutional investors are more likely to file claims in cases that are more likely to generate significant exposure);

whether the Securities and Exchange Commission has opened a formal or informal investigation of the defendant, or has initiated enforcement proceedings against the defendant, or whether the United States Department of Justice, or any other state or federal enforcement agency, has publicly identified the firm as a target or otherwise named it in a civil or criminal enforcement proceeding (on the theory that the presence of governmental enforcement proceedings increases the probability of exposure), or whether the company has restated its financials.

An additional feature of the Stratification Protocol is its ability to address the fact that a fraud at a single publicly traded firm can create exposure at several different insured entities. Consider, for example, the Enron or WorldCom frauds. There, insurers who provided coverage to investment banks that acted as underwriters in various Enron and WorldCom securities offerings were exposed to the Enron and WorldCom frauds even though they did not insure Enron or WorldCom. Stratification Protocols are readily structured to include potentially insured co-defendants, thereby creating an ability to customize incidence risk along an additional dimension not currently present in the market.

Figure 5:
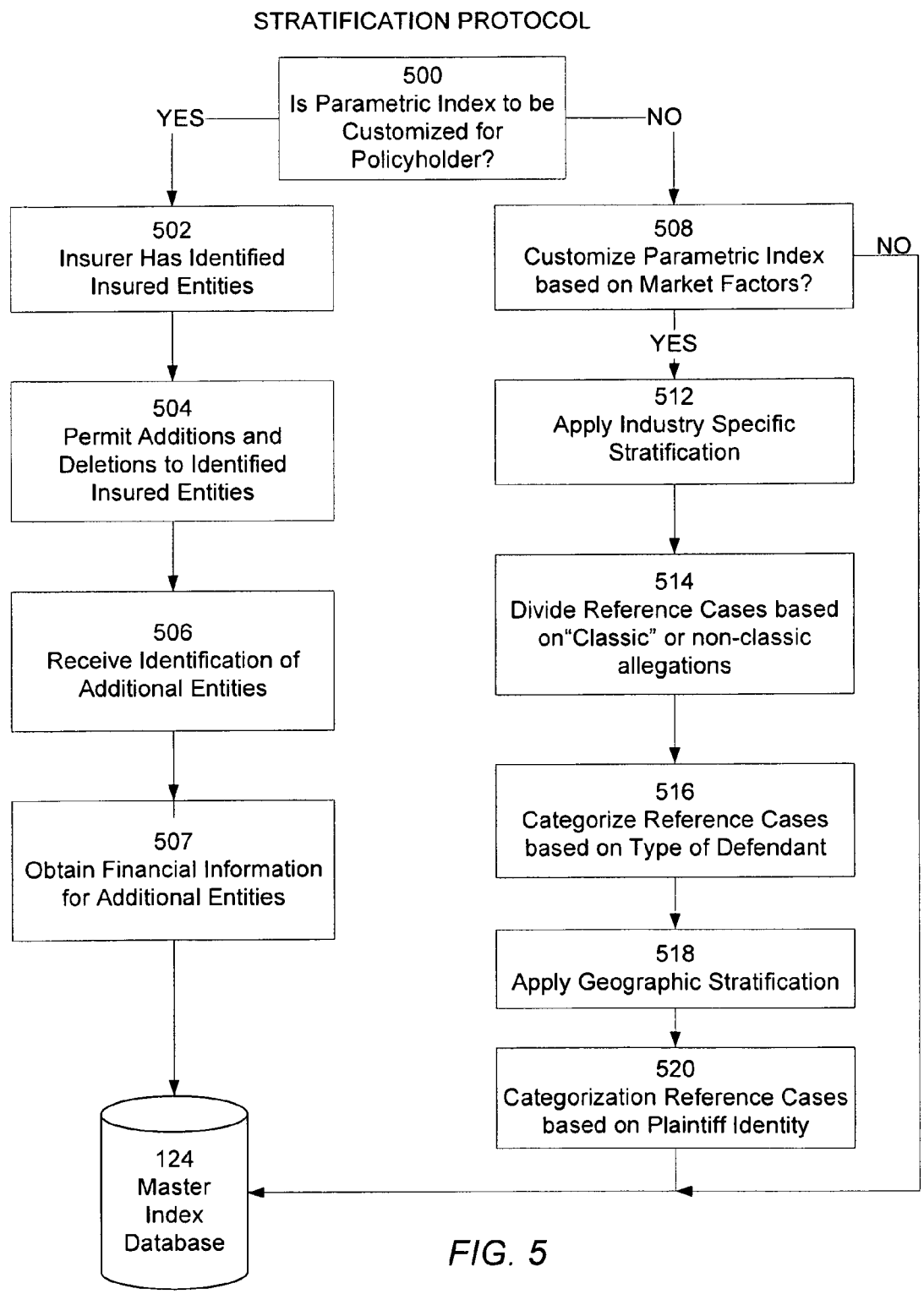
FIG. 5 illustrates an implementation of the Stratification Protocol.

Referring now to FIG. 5, the Stratification Protocol 214 is initiated 500 based on a parameter in the P-D&O indicating whether the parametric index is to be customized to reflect the primary insurer's specific portfolio. In one embodiment, the Stratification Protocol Parameters determine 502 whether the P-D&O purchaser initially identified its insured entities. Because the actual set of insured entities may, at the end of the Reference Period, diverge from the initially anticipated set, the Stratification Protocol Parameters can configure the Stratification Module 114 to optionally permit additions to or deletions 504 from the set of covered entities as additional issuers are covered or as coverage lapses. The Stratification Protocol Parameters can configure the Stratification Module 114 to enable 506 the primary insurer to add third-parties, particularly entities with potential underwriter or secondary-liability exposure as a consequence of claims brought against entities that are not themselves directly insured by the purchaser of the parametric reinsurance policy. Alternatively, the P-D&O could provide that the reinsurance policy's coverage automatically extends to all publicly traded issuers who are covered by the primary insurer during the relevant Reference Period. In either case, the relevant financial information (e.g., stock price, trading volume, etc.) for such entity is obtained as described above The result of this configuration of the Stratification Protocol 214 is that the Master Index Database 124 contains a subset of the full set of complaints filed during the Reference Period and defines the set of cases that can be considered for purposes of calculating the contractually specified parametric index. The identification of these cases is then added as a field or other form of flag or identifier to the Reference Cases in the Master Index Database 124.

Alternatively, for reasons described above, the parties to the reinsurance agreement can decide that the P-D&O will not be customized to reflect the insurer's specific portfolio, but will instead be customized 508 to reflect a variety of market factors, or not be customized at all 510.

If the Stratification Protocol Parameters includes a parameter indicating that Incidence Risk is to be customized 508 to reflect market factors, then there are a variety of dimensions of customization the Stratification Module 114 can implement. The Stratification Protocol Parameters can configure the Stratification Module 114 to apply 512 an industrial classification filter to selectively include (or selectively exclude as indicated in the parameters) entities in one or more identified industries. This filtering reflects the fact that different industries are more or less likely to be exposed to federal class action securities fraud litigation and that different primary insurers have varying levels of exposure to different industry classifications. Industry classifications can be obtained from a variety of sources, including, without limitation, Standard and Poors, Moody's, Yahoo, or Standard Industrial Classification ("SIC") codes developed by the United States Government, and that are relied upon by the SEC. Example industry classifications include financial, technology, pharmaceutical, biotechonology, healthcare, energy, and so forth.

The Stratification Protocol Parameters can configure the Stratification Module 114 to subdivide 514 the Reference Cases into two types of cases, "classic" and "non-classic" cases. Classic cases could, for example, be defined as all federal securities fraud class actions in which the underlying claim is that the issuer of a publicly traded security engaged in a material misrepresentation or omission that was proximately relates to a decline or increase in the price of at least one of its own publicly traded securities. All other cases, such as allegations that a securities analyst issued falsely optimistic reports on a third company's prospects, or that an underwriter made misrepresentations with respect to auction rate securities that were not issued by it, could be categorized as "non-classic" type of complaints. The P-D&O could elect to specify whether the index is to be calculated over all cases, or only over "classic" cases, defined as above, or through other specifications.

The Stratification Protocol Parameters can configure the Stratification Module 114 to determine the identity of the defendants in the Reference Cases, and categorize 516 these defendants as to whether they are issuers of the securities allegedly affected by the fraud, auditors of that issuer, underwriters of securities that give rise to the complaint, or transacted with the issuer in some other capacity. The parameters could, for example, optionally specify that defendants named only because of their actions in the capacity of underwriter in that suit either be included or excluded from the relevant computations.

A further optional form of stratification considers geographical factors. The Stratification Protocol Parameters can configure the Stratification Module 114 to include or exclude 518 foreign issuers with securities traded in U.S. markets, or to cause the construction of indexes focused solely on the exposure borne by issuers domiciled outside of the United States. Geographic stratification can also relate to the District or Circuit Courts in which a complaint is filed, on the observation that the probability of dismissal may be a function of geography, whether the issuer is a domestic or foreign entity, on the observation that foreign insurers may be particularly exposed to United States federal class action against foreign domiciled firms with securities traded in the United States. A more refined version of such stratification considers the identity of the judge to whom the case is assigned. As later illustrated, these forms of stratification need not lead to exclusion from the database, but could simply result in a data element that is later consider in conjunction with the measurement of the intensity risk associated with any complaint.

A further form of optional stratification enables the Stratification Protocol Parameters to configure the Stratification Module 114 to selectively include or exclude 520 Reference Cases based on the identity of the plaintiff, and/or the identity of the law firm representing the plaintiff. This stratification is based on the observation that the presence of certain plaintiffs or types of plaintiffs, or certain law firms, may be likely to be correlated with claims likely to give rise to greater or lesser liability.

The result here is that the set of Reference Cases in the Master Index Database 124 reflects the exclusion of certain complaints from further analysis, or potentially includes the addition of further fields or flags indicating differential treatment of certain complaints as part of the later application of an Intensity Measurement Protocol. The Master Index Database 124 is then supplemented with the information generated by the relevant Stratification Protocol.

Alternatively, parties to a P-D&O or to a related financial transaction can elect to not apply the Stratification Protocol 214 and thereby not adjust basis risk to reflect any form of Incidence Risk. This election causes the P-D&O to measure market-wide Incidence Risk and eliminates entirely the idiosyncratic incidence risk attributable to any market participants' underwriting decisions, in sharp distinction from current market practice.

4. Intensity Measurement Module and Intensity Measurement Protocol

Figure 6:
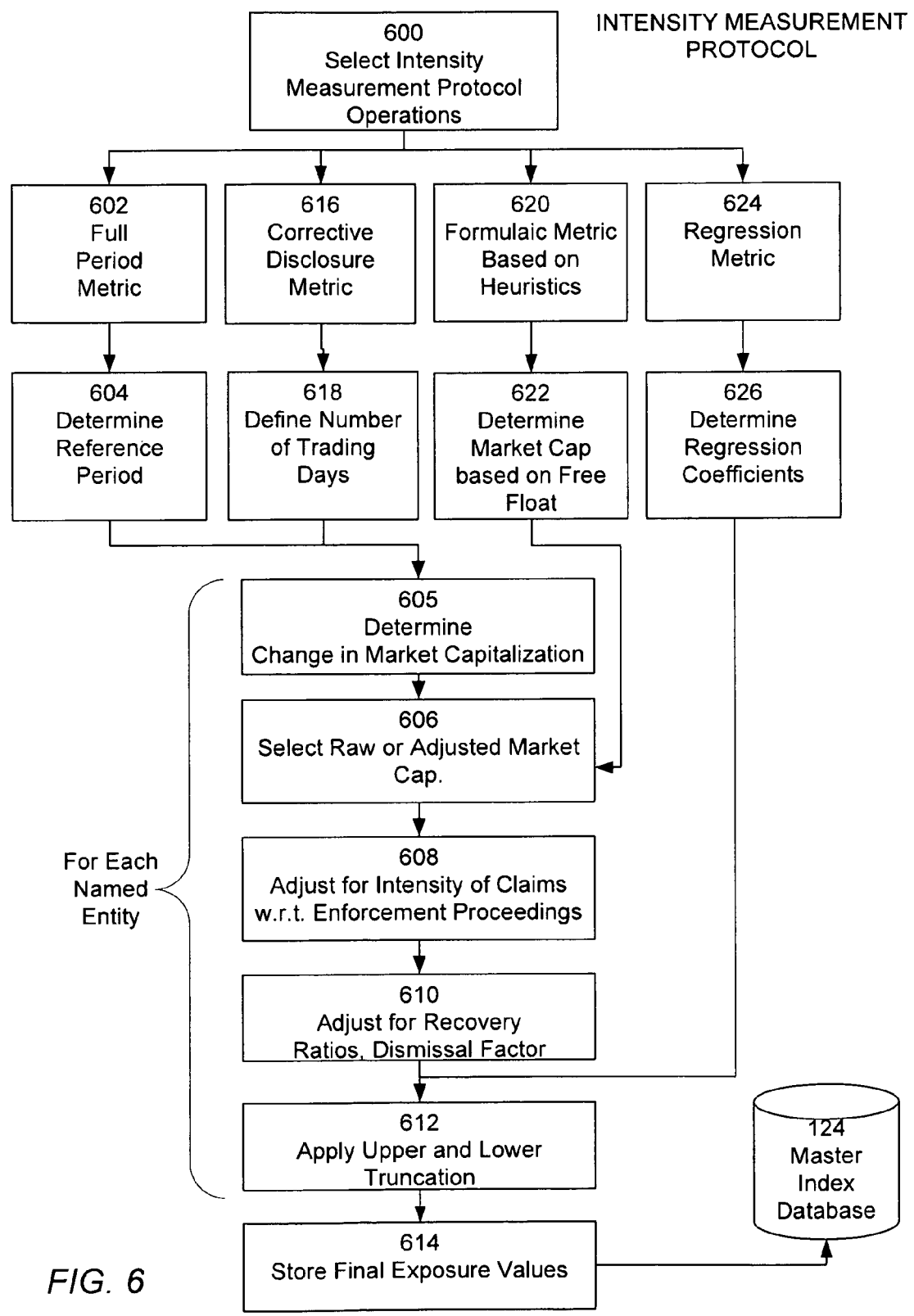
FIG. 6 illustrates an implementation of the Intensity Measurement Protocol.

The second component of basis risk, Intensity Risk, describes the magnitude of the potential loss arising conditional on a complaint having been filed. FIG. 6 illustrates an embodiment of the Intensity Measure Protocol 216. Parties to a P-D&O can define the Intensity Measurement Parameters that allow for selection 600 of several different approaches to be used in the Intensity Measurement Protocol 216.

The Intensity Measurement Parameters can define a Full Period Metric 602 as an intensity measure, defining it as the aggregate decline in market capitalization of the issuer named as a defendant in the Reference Complaint, measured from the peak price of the issuer-defendant's common stock observed during the full class period through to the value observed as of the end of the class period. This approach accesses 604 the relevant class period, and the corresponding price and market capitalization data for each of the Reference Cases (taking account of course of any entities that have been excluded or included by the Stratification Protocol) from the Master Index Database 124.

For each of the Reference Cases, the resulting change in market capitalization between the beginning and end of the Reference Period is determined 605 for each remaining (i.e., non-excluded) defendant or other entity. This change in market capitalization can either be accepted as a raw number or adjusted 606 to reflect changes in overall stock market values either through simple adjustment factors, such as by adjusting the decline to reflect the change in a broad market index (e.g., S&P 500 Dow Jones Industrial Average) over the equivalent time period, or through the application of multi-factorial regression techniques, or through the application of other statistical techniques designed to isolate the change in the issuer's stock price that is independent of or not attributable to larger stock market price movements.

Further adjustments 608 to the intensity measure, in the form of enhancements or deductions, can be indicated by the Intensity Measurement Parameters as Intensity Factors to be applied based on the observation of other criteria known or believed to be correlated with increased potential exposure, including, without limitation, the presence or absence of parallel legal proceedings against a named defendant (including criminal proceedings, and civil enforcement proceedings by the SEC), actions against underwriters and auditors ("Enforcement Factor"), and the pleading of a claim under Section 11 of the Securities and Exchange Act of 1933 ("Section 11 Factor"). In addition, delay factors such the speed with which the first complaint is filed, measured as the time delay between the end-of-class date and the date on a complaint is first filed, can be used to adjust the intensity measurement.

Recovery ratios, i.e., the percentage of a potential claim likely to be paid in a settlement, are known to be non-linear and display decreasing returns to scale. The percentage of recovery through settlement in a large claim will, all other factors equal, therefore likely be lower than the percentage recovery in a small claim. The Intensity Measurement Parameters can also include a Dismissal Factor describing the probability that a given claim will be dismissed by the presiding court. The Intensity Measurement Parameters can include a parameter that signals to the Intensity Measurement Protocol to apply 610 a set of elective, pre-specified adjustments to the intensity measure arising from any individual litigation. Examples of such adjustments include, without limitation, the use of a mathematical operations such as a logarithm of the predicted damage exposure, or through the application of a scale of potential exposures (e.g., x percent of the first $100 million, y percent of the next $400 million, where y<x, and z percent of the residual above $400 million, where z<y).

The Intensity Measurement Parameters can further include a parameter that signals the Intensity Measurement Protocol 216 to further adjust the intensity measure generated by any individual claim by truncation 612 from above or from below in order to reflect the policy limits and retentions inherent in the primary insurance market, as well as the layered structure of excess coverages. Because any insurer's exposure is typically conditioned on the insured having incurred expenses in excess of a retention level, the intensity measure can be calibrated to eliminate from consideration, or reduce the influence of, claims that appear small enough not to exceed retention levels or claims small enough not to reach the level of the excess coverage underwritten by any specific insurer.

Policies also have upper limits that define the maximum amount of exposure that an insurer can lose in the event of an individual claim. Thus, if a policy has a limit of $50 million and the expected intensity of exposure generated by a complaint is $500 million, then $450 million of exposure in excess of the policy limit cannot generate additional liability to insurer, whose risk is, by terms of the underlying insurance agreement, limited to $50 million. Similarly, a provider of excess coverage may be liable only, for exposures between $50 million and $75 million, even if the total policy is for $250 million. Thus the Intensity Measurement Protocol 218 can truncate 612 these exposures from above to reflect any individual insurer's maximum exposure to an individual insured would address this aspect of the market's structure.

The various adjustments set forth with respect to steps 606-612 can be applied iteratively, or as part of a single computation, depending on the implementation.

The resulting final adjusted litigation exposure values for each insured are then stored 614 in the Insured Exposure Database 124, a database comprising data relating to complaints that are to be considered in the calculation of the parametric index, including, in particular, the Intensity Measure generated by each of the cases associated with a particular insured.

Alternatively, the Intensity Measurement Parameters can define a Corrective Disclosure metric 616 as the Intensity Measure. This measure relies on changes in the issuer's market capitalization around the date of the final corrective disclosure alleged in the Reference Complaint, which is also typically the end of the class period. In this case, the Intensity Measurement Parameters will include a parameter 618 that indicates the number of trading days over which the change in market capitalization be computed 605 for the Reference Cases.

The resulting values can then be further processed as described above to reflect the election 606 of raw or market-adjusted metrics, adjustments 608 that reflect collateral information relating to the potential intensity of the alleged claims, recovery ratios 610, and the application 612 of lower truncation bounds and of upper truncation bounds before transferring 614 the results to the Insured Exposure Database 122.

A further alternative is that the Intensity Measurement Parameters can signal the Intensity Measurement Protocol to apply a Formulaic Metric 620 that relies on pre-determined heuristics. One such approach measures the intensity of any given lawsuit as a fixed percentage of the change in market capitalization, where market capitalization is computed 622 as the change in value of the issuer's free-float during the relevant period. Here, free-float can be defined in a variety of manners, including the application of formulae that exclude from the intensity measure any shares held by corporate insiders or large investors who appear not to have traded during the relevant class period. The resulting values can then be further processed 606 to reflect the election of raw or market-adjusted metrics, adjustments 608 that reflect collateral information relating to the potential intensity of the alleged claims, adjustments 610 that reflect the scale effect of recovery ratios, the application 612 of lower truncation bounds and of upper truncation bounds before storing 614 the results to the Insured Exposure Database 122.

A further alternative is that the Intensity Measurement Parameters can signal the Intensity Measurement Protocol to apply a Regression Metric 624 based on a regression estimate of potential exposure estimated over the Reference Cases, all cases in the Defined Domain, or some other dataset defined in the P-D&O, and with a regression technique specified by the parties to the P-D&O, or with a parameterization of a given technique specified upon by the parties. One possible example of such a regression technique is to estimate the value of the potential settlement as a function a known financial exposures of previous litigation matters and the characteristics of the litigation matter and the named defendants. For example, a regression coefficient can be estimated from the set of characteristics comprising: (1) the change in market capitalization observed over the entire class period and/or at the time of the corrective disclosure (including optional transformations of the variable to reflect scale effects, such as a logarithmic transform, or the inclusion of quadratic or higher order effects, and optional corrections to adjust for changes in aggregate stock market valuations); (2) the presence of parallel criminal proceedings, SEC enforcement proceedings, or derivative suits; (3) whether the claim is associated with an earnings restatement; (4) whether the complaint also names an accountant or underwriter defendant; (5) whether a public pension plan is the designated lead plaintiff; (6) whether the Reference Complaint includes a Section 11 allegation; and (7) the speed with which a complaint is filed. The coefficients generated by estimating 626 the contractually specified model would then be applied to the exogenous values that describe each of the Reference Cases upon which the claim is to be estimated after the application of the Stratification Protocol. The result would be a set of regression-generated individual intensity measures.

In the embodiment illustrated in FIG. 6, the resulting measures of individual intensity resulting from a regression application need not be further processed to reflect the election of raw or market-adjusted metrics, or adjustments that reflect collateral information relating to the potential intensity of the alleged claims, because these factors can be incorporated into the design and construction of the regression process. The P-D&O may, however, further specify the application of lower truncation bounds and of upper truncation bounds before storing 614 the results to the Insured Exposure Database 122.

Figure 7:
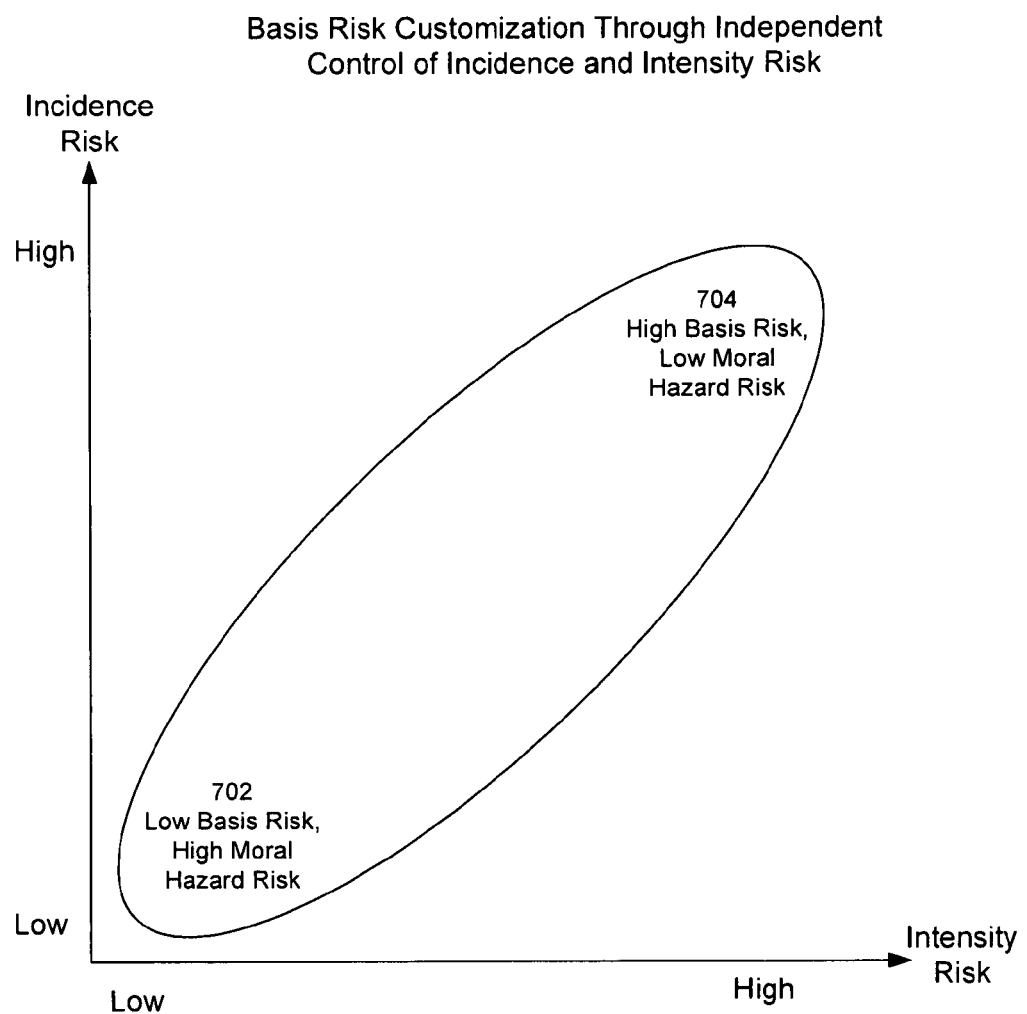
FIG. 7 is a concept diagram that illustrates the benefits of the ability to customize basis risk.

FIG. 7 illustrates the ability of PIM system 100 to customize basis risk through independent control of Incidence Risk and Intensity Risk using the parameters of the P-D&O to control the operation of the Stratification Protocol 214, and the Intensity Measurement Protocol. If parties to a P-D&O define the contract so that it (1) minimizes Incidence Risk by defining the parameters to the Stratification Protocol 214 that causes the Parametric Index to track the specific entities insured by the P-D&O, and (2) minimizes Intensity Risk by defining the parameters to the Intensity Measurement Protocol 216 that seek to replicate accurately the insurance exposures arising from each of the covered entities that enter computation of the Parametric Index, then (3) the result 702 is a low level of basis risk and a high level of moral hazard risk. All other factors equal, P-D&Os with these characteristics will likely call for higher premiums but will also be more highly valued by purchasers of P-D&O coverage.

In contrast, if parties to the P-D&O define the contract so that it (1) maximizes Incidence Risk by defining the parameters to the Stratification Protocol to include all relevant litigation filed over the Reference Period, thereby not attempting to track the specific entities insured by the P-D&O purchaser, and (2) maximizes Intensity Risk by defining parameters to the Intensity Measurement Protocol to measure the risk posed by any lawsuit without regard to the insurance exposures arising from each of the covered entities that enter computation of the Parametric Index, then (3) the result 704 is a high level of basis risk and a low level of moral hazard risk. All other factors equal, P-D&Os with these characteristics will likely call for lower premiums but will also be less valued by purchasers of P-D&O coverage.

Intermediate levels of customization generate intermediate levels of basis risk with correspondingly intermediate pricing implications. Customization in accordance with the techniques described herein allow the parties to P-D&Os to define parameters that adjust basis risk in order to better respond to market conditions (including, without limitation, changes in the price of traditional D&O reinsurance coverage), and evolving demands of individual insurers and re-insurers, which can be determined by factors exogenous to the D&O market, such as the need to reduce overall insurance portfolio risk, the presence of excess capital, or the scarcity of capital available for the relevant reinsurance function.

5. Index Generation and Cash Flow Module and Protocol

The Index Generation and Cash Flow Module 118 and Protocol 218 processes the data contained in the Insured Exposure Database 122 to generate one or more parametric indices 219 that describe the contingent cash flows from the provider of a P-D&O policy to the holder of the P-D&O policy.

Figure 8:
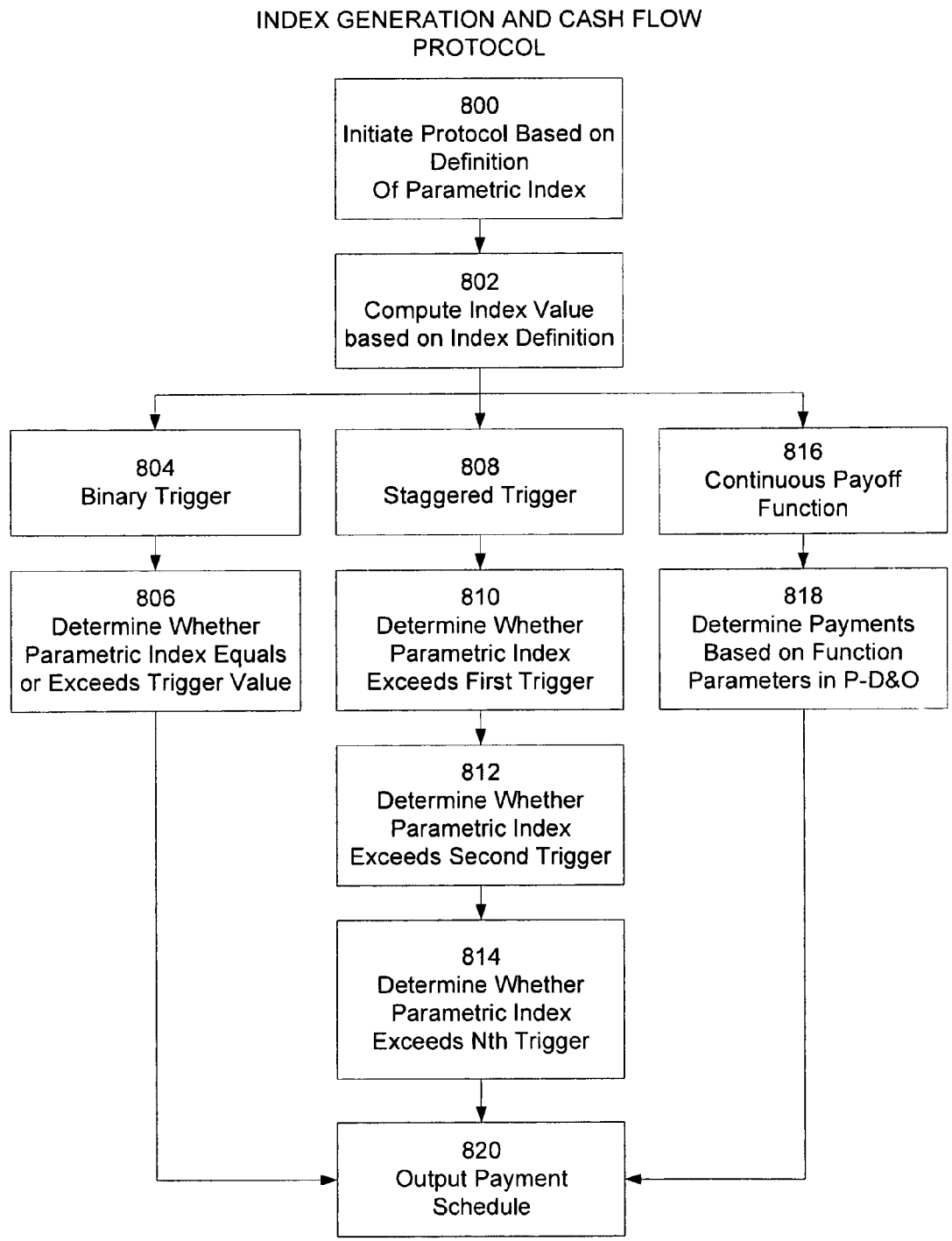
FIG. 8 illustrates an implementation of the Index Generation & Cash Flow Protocol.

FIG. 8 illustrates an embodiment of the Index Generation and Cash Flow Protocol 218. The Protocol is initiated 800 in response to Cash Flow Module Parameters including a definition of the parametric index and one or more trigger values of the index that cause contingent cash flows from the P-D&O seller to the P-D&O purchaser.

In general, the value of the parametric index is a function of the value of the individual potential exposures aggregated across all the Reference Cases and named entities in Insured Exposure Database 122 for the Reference Period. The definition of the index can, most simply in the context of the example provided herein, be the simple arithmetic sum of the exposures described in the Insured Exposure Database 122, although alternative mathematical transformations of that vector may be specified. These alternative transformations could, for example, exclude outliers from the calculation, where outliers are defined as the largest and smallest five percent of individual exposures, or as claims that exceed or fail to reach pre-specified dollar values. Based on the definition of the parametric index, the value of index is determined 802.

The flow of funds based on the parametric index is then determined based on the type of trigger, as either as a function of a Binary Trigger 804, a Staggered Trigger 808, or as a Continuous Payoff Function 816.

If the Cash Flow Module Parameters indicate the use a Binary Trigger 804, then the Index Generation and Cash Flow Protocol 218 determines when the selected parametric index value equals or exceeds 806 the predetermined threshold level; at this point the policy provider has an obligation to make payments in an amount and according to a schedule determined by the P-D&O. The payment schedule is then output 820 based on these amounts.

If the Cash Flow Module Parameters indicate the use of a Staggered Trigger 808, the P-D&O will include a series of trigger values (e.g., $1^{st}$, $2^{nd}$, $3^{rd}$, Nth threshold values) together with corresponding payment amounts and payment schedules; these trigger and payment values are retrieved from the Policy Database 120. The Index Generation and Cash Flow Protocol 218 then determines if the value of the parametric index exceeds 810 the first trigger level, in which case the policy provider incurs the obligation to pay the first payment amount according to a schedule determined by the P-D&O.

The Index Generation and Cash Flow Protocol 218 further determines the second trigger level is exceeded 812, in which case the policy provider incurs the further obligation to pay the second amount according to a schedule determined by the P-D&O.

The process can proceed to make similar determinations 814 for each of the N trigger levels with corresponding N obligations and payment schedules. The payment schedule is then output 820 based on these amounts.

If the Cash Flow Module Parameters indicate the use of a Continuous Payoff Function 816, the Index Generation and Cash Flow Protocol 218 then determines 818 the amount of the payment owed by the policy based on a function (typically a linear function) of the index value as further set forth in the P-D&O. This function can be further subject to the condition that the parametric index value achieves a pre-specified minimum value, and subject to the condition that no additional payment obligations arise once the parametric index value reaches a pre-determined maximum value, which would in turn define the maximum coverage, or policy limit, available under the terms of the P-D&O. Alternatively, the continuous payoff function could be defined without a minimum value, in which case the purchasers of the reinsurance policy are acquiring a "first dollar" policy that would result in a payment in the event that even one complaint satisfied the stratification criteria generating potential exposure for the writer of the policy or of the financial instrument.

The parties may, for accounting related reasons, also determine to adopt a hybrid contractual arrangement pursuant to which the obligation to pay first dollar claims is defined broadly and arises in the event that even a single class action securities claim or derivative claim is filed during the reference period, where that initial obligation is capped at a relatively low amount, and where the obligation to make additional, larger payments is contingent on formulae akin to the Binary Triggers, Staggered Triggers, or Continuous Payoff Functions described above. Additionally, for accounting and regulatory reasons, the parties may optionally further specify that all payments pursuant to the P-D&O be made into an escrow account from which withdrawals can be made by the insured only as covered losses are in fact incurred, and with the residue, if any, being returned to the writer of the P-D&O at the end of a specified N-year period. This optional feature of the P-D&O contract relates the P-D&O payment obligation to actually incurred losses in a manner that clearly relates the instrument's cash flows to insurable losses for purposes of regulatory definition.

6. Management of Timing and Credit Risk Under the PIM System

Figure 9A:
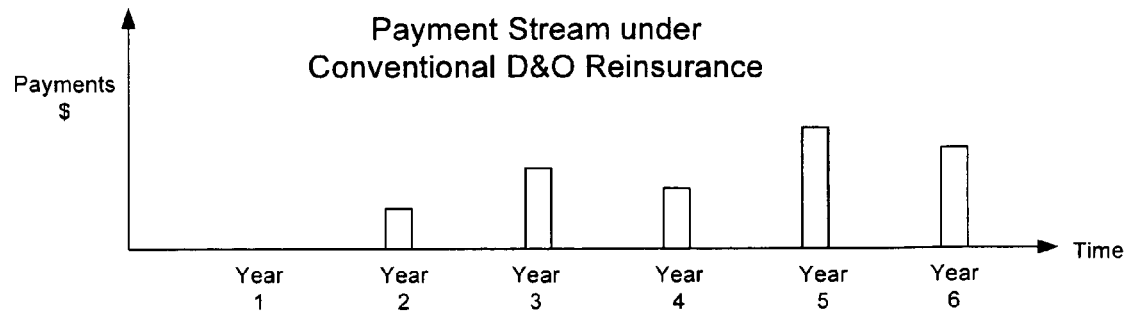
FIGS. 9a and 9b illustrate the reduction in credit risk exposure resulting from parametric D&O reinsurance.
Figure 9B:
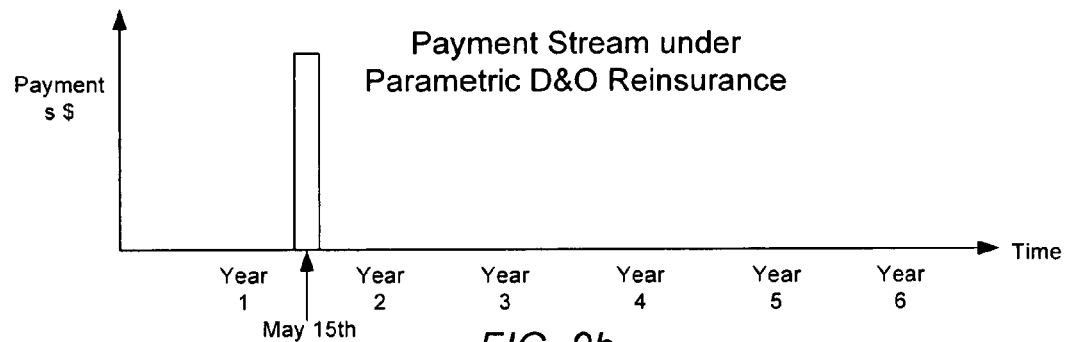

One of the benefits of the PIM system 100 in its ability to cause cash flows to occur more promptly than is the case under conventional reinsurance arrangements. FIGS. 9a and 9b illustrates the difference between cash flows from conventional reinsurance and under a P-D&O reinsurance policy. Traditional reinsurance arrangements require that the insurer incur the loss before the reinsurer has an obligation to make a payment under the contract. Because settlements of class action securities fraud claims typically occur several years after the filing of the first complaint that triggers to the insurer's obligation, the insurer may establish reserves in advance of the actual settlement of the action, and in advance of its receipt of traditional reinsurance payments. The insurer is, throughout this period, subject to the credit risk that the reinsurer will become insolvent before it is able to fulfill all of its commitments under the reinsurance policy. Further, the reinsurer has use of the capital that it will eventually have to pay to the primary insurer until a valid claim is made under the traditional form of reinsurance contract. Thus, as illustrated in FIG. 9a, the reinsurer has a number of varying payments over a multiple year period arising from a single reinsurance contract.

In contrast, as illustrated in FIG. 9b, settlement of a P-D&O that provides for a calendar year Reference Period, a three month Stub Period, and a forty five day Computation Period will cause settlement of the P-D&O by May 15 of the calendar year following the Reference Period. This early payment, as compared to conventional insurance can be highly beneficial to the direct insurer. Inasmuch as the average settlement occurs several years after the filing of a complaint, and inasmuch as a material percentage of settlements occur five or more years after the initial filing of the complaint, the timing advantage represented by parametric coverage can be substantial in the market for directors and officer's insurance coverage.

Agreements that provide for more prompt payments of claims are therefore beneficial to P-D&O purchasers because they reduce credit risk and provide the primary insurer with more prompt access to capital that may be necessary to help offset reserves established in advance of actual obligations to make payments to insured entities.

III. Standardized P-D&O Indices

The foregoing discussion of the PIM system 100 and the methodology describes the general process by which a reinsurer and insurer, or an insured and a direct insurer, can specifically define a customized parametric index for a given P-D&O. However, not all reinsurers and insurers have the capacity, experience or incentive to engage in the customization process. For these parties, an embodiment of the PIM system 100 provides a number of standardized P-D&O indices, from which a reinsurer and insurer can select one or more as the reference index for use in a given P-D&O.

For example, in a PIM System 100, standardized parametric indices include: (1) an index that measures litigation activity for all publicly traded companies, using a full period metric, without regard to truncation from above or below and that thereby minimizes the underwriting risk reflected in the index; (2) an index that measures litigation activity for all publicly traded companies, but truncated from above and below at levels characteristic of predetermined maximum policy coverage amount and predetermined retention amount encountered by insurers in general, thereby also minimizing underwriting risk while simultaneously reflecting common industry practice regarding retention levels and policy limits; or (3) an index that measures litigation activity as in (1) or (2) but calculated only for foreign domiciled issuers with securities traded in U.S. markets, thereby capturing the systemic risk faced by foreign insurers with clients exposed to U.S. securities market risk. Additional standardized indexes could be calculated on each of the these bases for major industry groups, specific geographic regions, or for any consolidation of such factors, as well as based independently on any other factor used in the Stratification Protocolol, such as geographic location of a defendant or jurisdiction in which a reference complaint is filed, type of allegation, and so forth.

For each standardized parametric index, the relevant protocol parameters for the different protocols would be defined beforehand and published so that potential users of the index understand how the index is constructed. For each standardized parametric index, the PIM system 100 would update the value of the index according to definition of the reference period defined therein. For example, a standardized parametric index can have a reference period defined as a calendar year, with the stub period and computation period as described above. In this case the PIM system 100 updates the index every May 15 following the close of the reference period year. Another standardized index can have a quarterly reference period (expiring March $31^{st}$, June $30^{th}$, September $30^{th}$, and December $31^{st}$), with a two week stub period, and a two week computation period. In this case the PIM system 100 updates this index on May $1^{st}$, August $1^{st}$, November $1^{st}$, and February $1^{st}$ respectively. During each update, the various protocols for case tracking, temporal allocation, stratification, index generation and cash flow would be executed according to the parameters for the standardized parametric index.

For the first example standardized parametric index mentioned above, all federal securities litigation nationwide filed during the reference period would form the basis for determining the reference cases, with the appropriate temporal allocation being applied by the Temporal Allocation Protocol for cases filed during the stub period. The Stratification Protocol would not be used to exclude any cases based on the categorical characterstics for the cases, as the index here is to cover all litigation activity. The Intensity Measurement Protocol would use, for example, a full period metric based on the net change in market capitialization of each of the publicly traded companies identified as defendants in this (large) collection of reference cases to determine a potential or hypothetical exposure for each reference case. The Index Generation and Cash Flow Protocol would then determine the value of the parametric index value then as the summed total of the potential exposures.

A further example of a standardized parametric index is a general market based index, in which the potential exposure truncated from above at $500 million. In this example, the Case Tracking Protocol Parameters would include a Domain Definition as those federal class action securities fraud litigation in which the defendant is a publicly traded corporation with a class of common stock traded in the United States, or an officer or director of such a firm where the alleged violation relates to mis-pricing of a security of the firm at which the individual is an officer or director.

The Case Tracking Protocol Parameters define the reference complaint as the first filed complaint as it appears in the PACER system 132, or if the complaint is filed in a jurisdiction that does not participate in the PACER system 132, then the first filed complaint as reflected in that court's docket sheet. The Reference Period can be defined as calendar year 2010, with a three month Stub Period, and a 45-day Computation Period, with a Sorting Protocol that includes within the Reference Period all first filed complaints filed during the Stub Period that allege an end-of-class period that is within calendar year 2010, and that also excludes from the Reference Period all first filed complaints filed within 2010 that allege an end-of-class period date in 2009 or earlier. The Stratification Protocol Parameters are set to minimize the transfer of underwriting risk by including all complaints that satisfy the domain definition and that fall within the reference period. The resulting set of litigation matters would be stored in the Insured Exposure Database 122.

The Intensity Measurement Parameters are defined to calculate each complaint's contribution to the index, C, according to the following multiplicative formula, as a Formulaic Metric 620:

$$C = MDL * \text{Recovery Ratio} * (1 - \text{Dismissal Factor} * \text{Section 11 Factor})$$

MDL is the change in market capitalization of the defendant issuer's common equity calculate from the peak observed between the beginning of the alleged class period and the end of the alleged class period. Recovery Ratio, Dismissal Factor, and Section 11 Factor are various ones of the adjustments provided by the Intensity Measurement Parameters are described above.

The Recovery Ratio can vary from between 0.0005 to 0.075, and can be conditioned upon the amount of the MDL ("MDL Band") and the period of time ("Delay Band") between the date the reference complaint is filed and the end of the of the alleged class period, subject to the constraint that the multiplicative product of is truncated so that it cannot exceed $500 million. The is set to a value of "small" if the MDL is less than about $2 billion, or to "large" if the MDL is about $2 billion or more. The is set to "slow" if the reference complaint is filed anywhere between 60 and 120 or more days after the end of the alleged class period, and "fast" if the complaint is filed fewer than 60-120 days after the end of the alleged class period. Generally, the relationship between the Recovery Ratio and the MDL Band and Delay Band can be described by the following table:

| MDL Band | Delay band | Range for Recovery Ratio |
| --- | --- | --- |
| Small | Slow | 0.01 to 0.05 |
| Small | Fast | 0.02 to 0.075 |
| Large | Slow | 0.0005 to 0.0025 |
| Large | Fast | 0.0025 to 0.0075 |

The Dismissal Factor is described by the following table:

| Delay Band | Range of Dismissal Factor |
| --- | --- |
| Slow | 0.20 to 0.50 |
| Fast | 0.15 to 0.45 |

The Section 11 Factor is described by the following table:

| Presence of Section 11 Factor | Range for Section 11 Factor |
| --- | --- |
| Absent | 1.0 to 1.5 |
| Present | 0.25 to 0.75 |

The Cash Flow Protocol then arithmetically aggregates the values of C for each defendant/entity identified in the Insured Exposure Database 122 in order to generate an aggregate index value for the reference period.

The Cash Flow Parameters in this example would define Staggered Triggers for the cash payments from the writer of the policy (here, the reinsurer) to the purchaser of the policy (here, the primary insurer) according to the following table:

| Aggregate Index Value | Payment by Reinsurer (Seller) to Insurer (Purchaser) |
| --- | --- |
| Below $6.1 billion | None |
| $6.1 billion to $8.6 billion | $0.10 for each dollar in excess of $6.1 billion, to maximum payment of $250 million |
| More than $8.6 billion | $250 million |

The payment schedule would require payments to made within ten business days of the end of the computation period. To facilitate cash flow and capital adequacy planning by the purchaser and seller of the agreement, the providers of the PIM System 100 would provide quarterly estimates of the aggegrated index value no later than 30 days following the end of each calendar quarter, subject to the qualification that the estimates are preliminary and are subject to further revision and review as part of the annual computation process.

IV. Benefits of PIMS and Parametric D&O Reinsurance Policies

The PIM system 100 and methodology provide a number of benefits to reinsurers and insurers, both individually, as well to insurance and reinsurance markets as whole. First, P-D&Os decouple systemic from idiosyncratic D&O insurance risk and allow separate pricing of each form of risk. Insurers are able to respond to these new and distinct price signals by constructing insurance and reinsurance programs that contain a blend of parametric reinsurance (designed primarily to shift systemic risk) and traditional non-parametric reinsurance (designed primarily to shift idiosyncratic underwriting risk). This feature will allow the market to attract new capacity and to develop pricing, terms, and conditions that cannot be attained through the application of current technology.

More specifically, the risk facing any insurance provider who writes D&O liability coverage can be decomposed into systemic and idiosyncratic components. Systemic risk describes the average risk incurred by the direct insurance industry's decision to provide D&O coverage over any arbitrarily determined time period. Idiosyncratic risk describes the extent to which the loss experience of any individual insurer is better or worse than risk-adjusted industry experience. Idiosyncratic risk thus reflects inferior or superior underwriting and claims management procedures.

Figure 10:
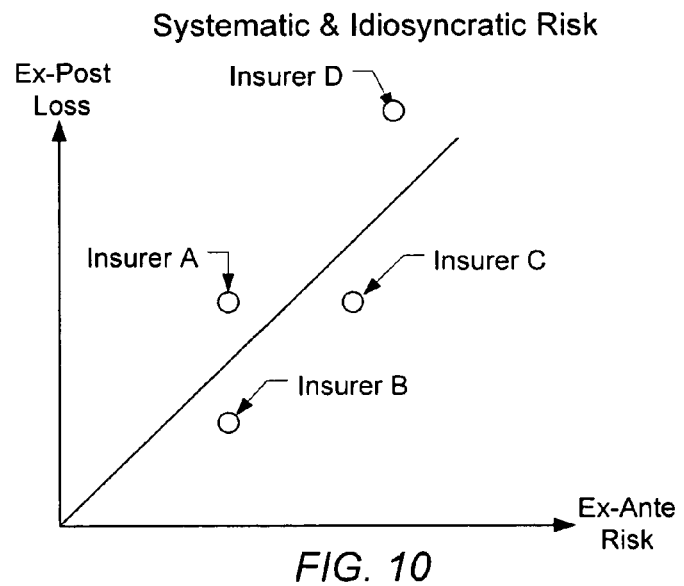
FIG. 10 illustrates the relationship between systemic and idiosyncratic risk.

FIG. 10 illustrates this distinction and amplifies its implications for the operation of the market for parametric directors and officers reinsurance. The horizontal axis of FIG. 10 represents the risk of providing directors and officers insurance coverage. The vertical axis represents the actual loss experience observed in the market. It is assumed here, for purposes of simplicity in exposition only, that the market for D&O insurance is actuarially fair over each relevant measurement period, and that average actual loss experience therefore equals the expectation of loss exposure in each relevant measurement period. The difference between any insurer's actual loss experience, as measured along the vertical axis, and its risk-adjusted risk exposure, as measured along the horizontal axis, reflects the insurer's idiosyncratic risk. That is, Insurers who appear above the equilibrium line experience ex-ante loss in excess of their assumed ex-ante risk, and vice versa.

Thus, as illustrated in FIG. 10, Insurers A and B wrote D&O insurance policies with identical risk. However, once actual claim experience is measured along the vertical axis, Insurer A appears to have incurred greater losses than Insurer B, suggesting that Insurer A had inferior underwriting and/or claim management procedures. Similarly, Insurer C is revealed to have superior risk-adjusted idiosyncratic risk than Insurer A (having assumed greater risk as Insurer A, but only the same loss). Insurer D is revealed to have inferior idiosyncratic risk, though incurred at different levels of risk.

Significantly, reinsurers find it difficult and expensive to assess individual insurers' underwriting and claims management skills. Judgments regarding industry-wide average litigation exposure are more readily developed. Accordingly, risk is cheaper to insure when expressed on a market-wide basis, here illustrated through the risk inherent in insuring a non-customized parametric index which seeks to measure the litigation risk facing the market as a whole. It follows that insurers may find it optimal to replace traditional insurance programs, which inherently incorporate the maximum amount of idiosyncratic underwriting risk and moral hazard, with insurance programs that blend traditional coverage with non-customized, or lightly customized, parametric coverage, which would reflect overall market experience, and are therefore likely to be less expensive P-D&O policies would then constitute the efficient means of insuring or reinsuring market-wide exposure, while the traditional non-parametric policies would constitute the efficient means of externalizing a portion of the insurer's idiosyncratic risk. In this application, the market would support the blending of parametric and non-parametric coverage through parallel insurance programs.

Second, by reducing the need to rely on stacking of excess layers as a means of risk shifting and risk mutualization, P-D&Os facilitate the ability of insureds and insurers alike to reduce the administrative costs inherent in the design and maintenance of stacks of excess coverage layers. It further facilitates the ability of all parties to the initial insurance agreement to structure insurance arrangements that are subject to fewer constraints imposed, directly or indirectly, as a consequence of limitations in the D&O reinsurance market. More precisely, insurers and insureds will be able to design the stack of excess liability coverage with less attention to capital constraints on primary insurers and greater attention to considerations such as the desirability of firebreaks, the administrative cost of dealing with a stack of excessive coverage layers, and the potential conflicts among providers of excess coverage.

Also, in reducing the complexity of the "stacks" used to provide coverage, the PIM system 100 and methodology provide reduce the incidence and intensity of disputes among insurers as to the appropriate amounts at which to settle lawsuits, as to the appropriate degree of risk to be followed in setting litigation strategies, and over the obligation of insurers lower in the stack to pay the maximum amount of exposure if insurers higher in the tower are willing to contribute to the settlement of the claim, among other conflicts. The net result is a further decline in the administrative costs associated with the construction of D&O insurance policies, as well as a decline in the costs of administering claims arising under such policies.

Further, because the parameters that determine payment obligations in a P-D&O can be defined with precision relatively quickly with respect to the end of the period over which litigation activity is to be measured, and because measurement of the parameter does not require any information regarding the actual claim history, payments pursuant to a P-D&O can be made much more quickly than under traditional forms of coverage. This feature of a P-D&O reduces credit risk inherent in these arrangements, and permits purchasers of reinsurance to obtain the capital necessary to cover their expense years in advance of the dates on which payments would be made pursuant to traditional forms of coverage.

Parametric D&O reinsurance coverage also opens the market to entities exposed to various forms of litigation risk correlated with D&O exposure, but who are, for a variety of reasons, currently unable to obtain insurance in from providers of conventional insurance or reinsurance. Audit firms, because of their high levels of exposure and of idiosyncratic risk, are an example of such entities. With the introduction of P-D&Os, these entities become able to obtain partial insurance coverage for the risks they face simply by purchasing the same form of parametric D&O reinsurance as would be made available to insurers. Sellers of reinsurance will be indifferent as to the identity of the purchaser, provided that P-D&O relies entirely on variables that are out of the purchaser's ability to control, and that therefore cannot generate moral hazard or underwriting risk.

Parametric D&O reinsurance coverage also reduces transaction and administrative costs to insurers and reinsurers relative to conventional insurance methods because it eliminates the need for insurers and reinsurers to engage in detailed review of specific case and claims files.

It follows that by introducing these efficiencies into the market, parametric D&O reinsurance expands insurance capacity, all other factors equal, and permit refinements in pricing and coverage terms that cannot be achieved with current market practice and technology.

V. Parametric Swap Contracts, Derivatives, and "Catastrophe" Bonds

The benefits of parametric D&O reinsurance can also be achieved through Deriviative P-D&O financial instruments and transactions that define payoffs as a function of the same exogenous parameters that defines obligations pursuant to a P-D&O.

Examples of such Deriviative P-D&O instruments and transactions include, without limitation: (1) "catastrophe bonds," debt instruments that pay interest in the nature of premia on insurance contracts and that provide that the borrower's obligation to repay principle can be terminated or reduced as a function of the level of the parametric measure of litigation activity; (2) swap contracts in which one counterparty's obligation to make payments to the other counterparty is contingent on the level of the parametric measure of litigation activity; (3) forward contracts in which the amount of the payment to be made at expiration is contingent on the level of the parametric measure of litigation activity; and (4) option contracts in which payoffs are a function of the same form of index incorporated into a P-D&O. The Domain Definition for each of these instruments also need not be constrained to class action securities fraud litigation and can encompass other occurrences that give rise to litigation events, such as financial restatements, announcements of formal or informal orders of inquiry entered by the SEC, announcements of federal or state civil or criminal enforcement proceedings.

The presence of such instruments can expand the size and liquidity of the market by opening transactions to parties who are not otherwise licensed to provide insurance or reinsurance but who are legally permitted to engage in substantially similar risk shifting transactions. These instruments could, for example, be bought or sold by investors who are long or short specific securities or portfolios of securities as a hedge against the occurrence of litigation-related events, including, but not limited to, class action securities fraud litigation.

Here too, the existence of such Deriviative P-D&O instruments and transactions depends on the ability to define a suitable measure of aggregate litigation activity that is sufficiently correlated with various forms of exposure likely in fact to arise in the marketplace. A suitable parametric measure of D&O liability must also not be subject to influence by parties with an interest in the cash flows that are affected by the existence of such instruments or arrangements.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, the techniques described herein may be applied to other types of insurance and financial instruments, possibly those not yet created, such as where shares of the instrument are traded and are based on an underlying set of tradable securities or other items.

As would be known to one of skill in the art, it is not necessary for the elements to be configured as shown; the elements can be hosted by other entities or in some cases may even stand-alone. In some implementations of the system, the various elements may also appear in different configurations. Furthermore, it is not necessary for every embodiment of the invention to include all of the elements depicted. Likewise, as other elements and sub-elements are described throughout the invention, it should be understood that various embodiments of the invention may exclude elements and sub-elements described, that the elements and sub-elements may be hosted in configurations other than those shown, and that elements and sub-elements, even within an element, may be hosted in different locations or by different entities than those shown.

Some portions of this description describe the embodiments of the invention in terms of algorithms and symbolic representations of operations on data. These algorithmic descriptions and representations are commonly used by those skilled in the art to convey the substance of their work effectively to others skilled in the art. These operations, while described functionally, computationally, or logically, may be understood to be implemented by computer programs or equivalent electrical circuits, microcode, or the like. The particular division of functionality between the various modules or components may differ from that described herein, given the variety of software development environments and hardware platforms that may be used to practice the invention. The particular naming of the components, capitalization of terms, the attributes, data structures, or any other programming or structural aspect is not mandatory or significant, and the mechanisms that implement the invention or its features may have different names, formats, or protocols.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Such a computer program may be stored in a tangible computer readable storage medium or any type of media suitable for storing electronic instructions. Embodiments of the invention may also relate to an apparatus for performing the operations described herein. This apparatus may be specially constructed for the required purposes, and/or it may comprise a general-purpose computing device selectively activated or reconfigured by a computer program stored in the computer.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

The invention claimed is:

1. A method, performed by a computer system, for determining a parametric index value for a parametric Directors' & Officers' insurance policy issued by a policy provider to a policy holder, the method comprising:

accessing from a policy database by the computer system a plurality of parameters for the parametric Directors' & Officers' insurance policy, the plurality of parameters including a reference period;

selecting by the computer system from at least one information source a plurality of filed litigation cases filed against one or more corporate defendants for which there is a potential future financial exposure to the policy holder based on the plurality of parameters for the parametric Directors' & Officers' insurance policy;

allocating by the computer system each of the selected cases to the reference period associated with the parametric index, and storing the allocated cases to an index database;

filtering by the computer system the selected cases in the index database with respect to one or more categorical characteristics of the cases, the categorical characteristics specified in the parameters;

dynamically determining by the computer system for each of the filtered cases the potential future financial exposure to the policy holder based upon a change in a market capitalization of each defendant during the reference period and storing the determined potential future financial exposures in an exposure database;

accessing by the computer system the exposure database and determining from the potential future financial exposures of the filtered cases, a value of the parametric index, where the value of the parametric index is not fixed and predetermined, and storing the parametric index; and determining by the computer system, based on the parametric index value, amounts of one or more payments due from the policy provider to the policy holder.

2. The method of claim 1, wherein selecting by the computer system a plurality of filed litigation cases comprises:

identifying by the computer system, using the at least one information source, a reference complaint filed against the one or more defendants for each litigation case within the reference period.

3. The method of claim 2, wherein identifying by the computer system, using the at least one information source, a reference complaint comprises selecting either a first filed complaint, a last filed complaint, or a most expansive complaint.

4. The method of claim 2, further comprising:

extracting from an identified reference complaint:
(1) the identity of each named defendant;
(2) a start date of an alleged class period;
(3) an end date of the alleged class period;
(4) dates of corrective disclosures alleged in the reference complaint;
(5) causes of action alleged in the reference complaint;
(6) a jurisdiction in which the reference complaint is filed;
(8) the law firms representing the named plaintiff; and
(9) the identity of plaintiffs on whose behalf the class action complaint is filed; and storing the extracted information for each litigation case in a database.

5. The method of claim 4, wherein selecting by the computer system a plurality of filed litigation cases further comprises:

for each selected litigation case, retrieving from an information source financial information for each named defendant, including stock price information and trading volume for the named defendant during the reference period; and storing the retrieved financial information for each named defendant in the database in association with the extracted information for the litigation case.

6. The method of claim 1, wherein allocating by the computer system each of the selected cases to the reference period associated with the parametric index further comprises:
   determining a start date and an end date for a current reference period based on the parameters;
   determining a start date and end date for a stub period following the current reference period based on the parameters;
   determining a start date and an end date for a computation period following the stub period based on the parameters;
   allocating litigation cases filed within the start date and end date of the reference period to the reference period;
   allocating litigation cases filed within the start data and end date of the stub period to either the current reference period or a subsequent reference period based on the parameters; and
   excluding from the reference period cases filed within the computation period based on the parameters.

7. The method of claim 1, wherein filtering by the computer system the selected cases with respect to one or more categorical characteristics of the cases, comprises:
   filtering the selected cases to allocate an incidence risk for each case between the policy holder and policy provider.

8. The method of claim 1, wherein filtering by the computer system the selected cases with respect to one or more categorical characteristics of the cases, comprises:
   responsive to the parameters of the parametric Directors' & Officers' insurance policy in the policy database, selectively applying a filter to include or exclude a named defendant or a case from the parametric index based on the categorical characteristics, wherein the categorical characteristics include at least one of:
      the identity of a named defendant in a case;
      the identity of a named plaintiff in a case;
      one or more industry classifications of a named defendant in a case;
      a type of allegation in the reference complaint for a case;
      a type of security that is the subject of the fraud alleged in a complaint;
      a geographic location of a named defendant in a case; and
      a geographic location where the reference complaint is filed.

9. The method of claim 1, wherein dynamically determining by the computer system for each of the filtered cases the potential future financial exposure to the policy holder comprises:
   responsive to the parameters of the parametric Directors' & Officers' insurance policy in the policy database, selecting a metric for measuring the potential financial exposure to a policy holder from each of the litigation cases to be included in the parametric index;
   for each litigation case to be included in the parametric index:
      retrieving from an information source financial information for each named defendant, including stock price information and trading volume for the named defendant during the reference period;
      applying the selected metric to the financial information of a named defendant in the litigation case to determine a financial exposure for that named defendant based upon a change in the market capitalization of the named defendant during the reference period;
      selectively adjusting the determined financial exposure from the litigation case; and
      storing the adjusted financial exposure for each litigation case in the database.

10. The method of claim 9, wherein the metric for measuring the potential financial exposure to policy holder from each of the litigation cases to be included in parametric index comprises:
   a full period metric, wherein the potential financial exposure is an aggregate decline in the market capitalization of a named defendant in the litigation case during a class period alleged in the reference complaint.

11. The method of claim 9, wherein the metric for measuring the potential financial exposure to policy holder from each of the litigation cases to be included in parametric index comprises:
   a corrective disclosure metric, wherein the potential financial exposure is a change in the market capitalization, over a specified number of trading days, of a named defendant in the litigation case around the date of a final corrective disclosure alleged in the litigation case.

12. The method of claim 9, wherein the metric for measuring the potential financial exposure to policy holder from each of the litigation cases to be included in parametric index comprises:
   a formulaic metric, wherein the potential financial exposure is a percentage of a change in a free-float in securities of a named defendant during the reference period.

13. The method of claim 9, wherein the metric for measuring the potential financial exposure to policy holder from each of the litigation cases to be included in parametric index comprises:
   a regression metric, wherein the potential financial exposure is based upon a regression estimate from a regression of financial exposures of litigation cases and their characteristics, as applied to characteristics of the litigation cases included in the parametric index and the market capitalization of the defendants in the litigation cases.

14. The method of claim 9, wherein selectively adjusting the determined financial exposure from the litigation case comprises:
   adjusting by the computer system the determined financial exposure based on changes in overall stock market values during the reference period, so as to isolate a change in the named defendant's market capitalization independent of the changes in the overall stock market, and storing the adjusted financial exposure in the exposure database.

15. The method of claim 9, wherein selectively adjusting the determined financial exposure from the litigation case comprises:
   adjusting by the computer system the determined financial exposure based upon potential increased exposure resulting from legal proceedings against a named defendant, and storing the adjusted financial exposure in the exposure database.

16. The method of claim 9, wherein selectively adjusting the determined financial exposure from the litigation case comprises:
   adjusting by the computer system the determined financial exposure based on an estimated recovery ratio from settlement of the litigation case, and storing the adjusted financial exposure in the exposure database.

17. The method of claim 9, wherein selectively adjusting the determined financial exposure from the litigation case comprises:

adjusting by the computer system the determined financial exposure by truncating the financial exposure based upon a policy limitation of the policy holder, a retention level for a claim, or excess coverage from other insurers, and storing the adjusted financial exposure in the exposure database.

18. The method of claim 17, wherein adjusting the determined financial exposure by truncating the financial exposure comprises:
adjusting by the computer system the determined financial exposure by truncating the financial exposure based upon an upper policy limit of the policy holder with respect to an individual claim arising from the litigation case, and storing the adjusted financial exposure in the exposure database.

19. The method of claim 17, wherein adjusting the determined financial exposure by truncating the financial exposure comprises:
adjusting by the computer system the determined financial exposure by truncating the financial exposure based upon a lower policy limit of the policy holder with respect to an individual claim arising from the litigation case, and storing the adjusted financial exposure in the exposure database.

20. The method of claim 1, wherein dynamically determining by the computer system for each of the filtered cases the potential future financial exposure to the policy holder based upon a change in a market capitalization of each defendant during the reference period comprises:
excluding at least one of the determined potential future financial exposures as an outlier value.

21. The method of claim 1, wherein determining by the computer system, based on the parametric index value, one or more payments due from the policy provider to the policy holder, comprises:
determining at least one trigger condition for the one or more payments due the policy provider; and
responsive to the parametric index value equaling or exceeding the trigger condition, determining a schedule of payments due from the policy provider to the policy holder, and storing the schedule of payments.

22. The method of claim 21, wherein the trigger condition comprises a binary trigger, being a predetermined threshold value specified in the parameters of the parametric Directors' and Officers' insurance policy.

23. The method of claim 21, wherein the trigger condition comprises a scheduled trigger, being a series of threshold values specified in the parameters of the parametric Directors' and Officers' insurance policy.

24. The method of claim 21, wherein the trigger condition comprises a continuous payoff function specified in the parameters of the parametric Directors' and Officers' insurance policy.

25. A computer program product, stored on a non-transitory computer storage medium, for controlling a computer system to determine a parametric index value for a parametric Directors' & Officers' insurance policy issued by a policy provider to a policy holder by performing the method comprising:
storing in a policy database computer information about the parametric Directors' & Officers' insurance policy issued by the policy provider to the policy holder, the information including a plurality of parameters, the parameters including a reference period;
selecting from a database of litigation information a plurality of filed litigation cases filed against one or more corporate defendants for which there is a potential future financial exposure to the policy holder based on the parameters in the stored policy;
allocating each of the selected cases to the reference period associated with the parametric index, and storing the allocated cases in a database;
filtering in the database the selected cases with respect to one or more categorical characteristics of the cases, the categorical characteristics specified in the parameters;
dynamically determining for each of the filtered cases the potential future financial exposure to the policy holder based upon a change in a market capitalization of each defendant during the reference period;
determining from the potential future financial exposures of the filtered cases, a value of the parametric index, where the value of the parametric index is not fixed and predetermined; and
determining, based on the parametric index value, the amounts of one or more payments due from the policy provider to the policy holder, and storing the determined payments in association with the insurance policy in the policy database.

26. A method, performed by a computer system, for determining a parametric index value for a parametric derivative financial instrument issued by an issuer to a purchaser, the method comprising:
accessing from a policy database by the computer system a plurality of parameters based upon the parametric derivative financial instrument that define protocols by which the parametric index for the financial instrument is to be determined, wherein the parameters include a reference period, and at least one category of events;
identifying by the computer system using an information source a plurality of events that occurred within the reference period and that match at least one category included in the parameters, wherein the matching events comprise filed litigation events related to publicly traded companies for which there is a potential future financial exposure;
accessing by the computer system a database of securities information to determine a change in a market capitalization of each of the publicly traded companies during the reference period;
determining by the computer system a parametric index value derived from the potential future financial exposure resulting from the matching events, the potential future financial exposure based upon a change in the market capitalization of each of the publicly traded companies during the reference period;
determining by the computer system whether the issuer has an obligation to make at least one payment to the purchaser pursuant to the financial instrument, based upon the parametric index value; and
responsive to determining that the issuer has an obligation to make at least one payment, determining by the computer system an amount of the one or more payments due from the issuer to the purchaser based upon the parametric index value.

27. The method of claim 26, wherein the derivative financial instrument is selected from a group consisting of:
a catastrophe bond, wherein the issuer's obligation to repay a principle amount of the bond can be terminated or reduced as a function of the parametric index value;
a swap contract, wherein the issuer's obligation to make payments to the purchaser is contingent on the parametric index value;

a forward contract, wherein the amount of the one or more payments to be made at an expiration of the forward contract is contingent on the parametric index value; and an option contract, wherein the payments are contingent on the parametric index value.

28. A computer system configured to determine a parametric index value for a parametric Directors' & Officers' insurance policy issued by a policy provider to a policy holder, comprising:

a policy database computer configured to store policy information for the parametric Directors' & Officers' insurance policy issued by the policy provider to the policy holder, the information including a plurality of parameters, the parameters including a reference period;

a case tracking module configured to execute a case allocation protocol to select from at least one information source a plurality of filed litigation cases filed against one or more corporate defendants for which there is a potential future financial exposure to the policy holder using the plurality of parameters for the parametric Directors' & Officers' insurance policy stored in the policy database;

a temporal allocation module configured to execute a temporal allocation protocol to allocate each of the selected cases to the reference period associated with the parametric index, and to store the allocated cases to an index database;

a stratification module configured to execute a stratification protocol to filter the selected cases in the index database using one or more categorical characteristics of the cases, the categorical characteristics specified in the parameters in the policy database;

an intensity measurement module configured to execute an intensity measurement protocol to access the filtered cases in the index database and to access at least one information source for market capitalization information of each defendant during the reference period, and determine a potential future financial exposure to the policy holder based upon a change in the market capitalization of each defendant during the reference period, and to store the determined potential future financial exposures in an exposure database; and an index generation module configured to execute an index generation protocol to access the exposure database and determine from the potential future financial exposures of the filtered cases, a value of the parametric index, where the value of the parametric index is not fixed and predetermined, and store the parametric index, and to determine, based on the parametric index value, amounts of one or more payments due from the policy provider to the policy holder.

* * * * *